(12) United States Patent
Hashimoto

(10) Patent No.: US 7,515,756 B2
(45) Date of Patent: Apr. 7, 2009

(54) REGION SEGMENTATION AND CHARACTERIZATION SYSTEMS AND METHODS FOR AUGMENTED REALITY

(75) Inventor: Roy T. Hashimoto, Redwood City, CA (US)

(73) Assignee: Shoestring Research, LLC., Redwood City, CA (US)

(*) Notice: Subject to any disclaimer, the term of this patent is extended or adjusted under 35 U.S.C. 154(b) by 822 days.

(21) Appl. No.: 10/602,996

(22) Filed: Jun. 23, 2003

(65) Prior Publication Data

US 2004/0258314 A1    Dec. 23, 2004

(51) Int. Cl.
G06K 9/62 (2006.01)

(52) U.S. Cl. ........................ 382/224; 382/165

(58) Field of Classification Search .............. 382/294, 382/103, 151, 147, 154, 317, 224, 165; 600/427, 600/429, 439; 385/49; 606/130; 250/282; 438/39; 125/13.01; 257/E21.599, 797, E23.179
See application file for complete search history.

(56) References Cited

U.S. PATENT DOCUMENTS

| | | | | |
|---|---|---|---|---|
| 5,341,439 | A * | 8/1994 | Hsu | 382/103 |
| 5,384,859 | A * | 1/1995 | Bolza-Schunemann et al. | 382/112 |
| 5,956,468 | A * | 9/1999 | Ancin | 358/1.9 |
| 6,009,196 | A * | 12/1999 | Mahoney | 382/176 |
| 6,754,370 | B1 * | 6/2004 | Hall-Holt et al. | 382/106 |
| 6,804,394 | B1 * | 10/2004 | Hsu | 382/173 |
| 6,993,177 | B1 * | 1/2006 | Bachelder | 382/151 |

OTHER PUBLICATIONS

"Analysis Of Conics", by Kenichi Kanatani, Geometric Computation for Machine Vision, Oxford Univ. Press 1993, pp. 229-259.
"Computer Vision Face Tracking For Use in a Perceptual User Interface", by Gary R. Bradski, Microcomputer Research Lab, Intel Corp., pp. 1-15.
"Real-time Vision-Based Camera Tracking for Augmented Reality Applications", by Dieter Koller et al., (no date), 8 pgs.
"Virtual Object Manipulation on a Table-Top AR Environment", by H. Kato et al., (no date), 9 pgs.
"Computer vision for computer games", by W.T. Freeman et al., Mitsubishi, IEEE 2nd Int'l. Conference On Automatic Face and Gesture Recognition, Killington, VT, Oct. 1996, 6 pgs.
"Matrix: A Realtime Object Identification and Registration Method for Augmented Reality", Jun Rekimoto, Sony Computer Science Lab., Inc., (no date), 6 pgs.
"Superior Augmented Reality Registration by Integrating Landmark Tracking and Magnetic Tracking", by Andrei State, et al., Dept. of Computer Science Univ. of N. Carolina at Chapel Hill, (no date), 10 pgs.

(Continued)

*Primary Examiner*—Sheela C Chawan
(74) *Attorney, Agent, or Firm*—Silicon Valley Patent Group, LLC; Edward S. Mao

(57) ABSTRACT

A novel method of region segmentation for an image is disclosed. Specifically, region segmentation is accomplished by dividing the image into a plurality of sticks of pixels and determining whether each stick belongs to any region from a set of region. Each stick that belongs to any region is classified as belonging to a specific region.

64 Claims, 14 Drawing Sheets

OTHER PUBLICATIONS

"Rule-Based Segmentation for Intensity-Adaptive Fiducial Detection", by Jong-Weon Lee et al., Computer Science Dept. Univ. of Southern California, (no date), 9 pgs.

"Finding Ellipitcal Shapes in an Image Using a Pyramid Architecture", by A. Kavianpour et al., Univ. of California, Dept. of Electrical and Computer Engineering, Irvine, CA, (no date), pp. 1-15.

"9.13 Image Segmentation", by Anil K. Jain, Fundamentals of Digital Image Processing, 1987, pp. 407-414.

"Invariant Descriptors for 3-D Object Recognition and Pose", by David Forsyth et al.,, 1991 IEEE, pp. 971-991.

"Computer Vision Face Tracking For Use in a Perceptual User Interface", by Gary R. Bradski, Microcomputer Research Lab, Intel Corp., pp. 1-15, 1998.

"Real-time Vision-Based Camera Tracking for Augmented Reality Applications", by Dieter Koller et al., (no date), 8 pgs, Sep. 15-17, 1997.

"Virtual Object Manipulation on a Table-Top AR Environment", by H. Kato et al., (no date), 9 pgs, Oct. 5-6, 2000.

"Matrix: A Realtime Object Identification and Registration Method for Augmented Reality", Jun Rekimoto, Sony Computer Science Lab., Inc., (no date), 6 pgs, Jul. 15-17, 1998.

"Superior Augmented Reality Registration by Integrating Landmark Tracking and Magnetic Tracking", by Andrei State, et al., Dept. of Computer Science Univ. of N. Carolina at Chapel Hill, (no date), 10 pgs, Aug. 4-9, 1996.

"Rule-Based Segmentation for Intensity-Adaptive Fiducial Detection", by Jong-Weon Lee et al., Computer Science Dept. Univ. of Southern California, (no date), 9 pgs, Jan. 24-29, 1999.

"Finding Ellipitcal Shapes in an Image Using a Pyramid Architecture", by A. Kavianpour et al., Univ. of California, Dept. of Electrical and Computer Engineering, Irvine, CA, (no date), pp. 1-15, Jan. 1995.

* cited by examiner

|     | P_0 | P_1 | P_2 | P_3 | P_4 | P_5 | P_6 | P_7 | P_8 | P_9 | P_10 | P_11 | P_12 | P_13 | P_14 | P_15 |
| --- | --- | --- | --- | --- | --- | --- | --- | --- | --- | --- | --- | --- | --- | --- | --- | --- |
| L_0 | 0 | 0 | 0 | 179 | 0 | 0 | 0 | 0 | 0 | 0 | 0 | 0 | 0 | 189 | 0 | 0 |
| L_1 | 0 | 0 | 201 | 234 | 196 | 198 | 0 | 0 | 0 | 0 | 0 | 0 | 184 | 216 | 0 | 0 |
| L_2 | 0 | 0 | 192 | 67 | 189 | 212 | 0 | 200 | 199 | 0 | 0 | 0 | 0 | 0 | 0 | 0 |
| L_3 | 0 | 0 | 0 | 207 | 194 | 0 | 0 | 0 | 0 | 0 | 0 | 0 | 0 | 191 | 194 | 0 |

REGION SEGMENTATION AND CHARACTERIZATION SYSTEMS AND METHODS FOR AUGMENTED REALITY

FIELD OF THE INVENTION

The present invention relates to digital image processing. More specifically, the present invention relates to image analysis using region segmentation, image moments, and fiducials.

BACKGROUND OF THE INVENTION

The goal of most computer vision systems is to allow a computer to analyze and understand the scenes in an image. Typically, an image is analyzed to find features in the image, which can be recognized by the computer vision system. Computer vision systems have typically been used for passive tasks such as mail sorting, tumor detection, parts identification, map making, and fingerprint matching. However, as the processing power of computer systems has improved interactive tasks using computer vision have been developed.

For example, computer vision can be used to determine the location and orientation of a user in the environment of an augmented reality system. In conventional augmented reality systems a 3D virtual environment is displayed to the user using for example a head mounted display or a monitor. The 3D virtual environment changes based on the actions of the user. Conventional augmented reality systems typically use a user interface device, such as a joystick or a mouse. However, if a camera is mounted on the user's head so that a computer vision system receives an image of what the user sees, the user's natural head movement can be used to control by the augmented reality system to determine the what part of the virtual environment should be shown to the user.

Specifically, one or more markers, called fiducials, are placed in the actual physical environment of the user. Depending on the application, the fiducials could be placed in predetermined locations, on movable objects, or on fixed objects. The computer vision system must detect the fiducials and then analyze the fiducials to determine relative location of the fiducial from the camera. Using the relative location of the fiducials, the augmented reality system can determine the location and orientation of the camera. Because the camera is mounted to the user's head, the location and orientation of the camera is the same as the location and orientation of the user's head. The location and orientation of an object (e.g. the camera or the user's head) is generally called the "pose" of the object.

The process of identifying, and analyzing the fiducial to determine the pose of the camera mounted on the user's head is very difficult. Furthermore, to provide adequate response to the user's head movement, the pose of the user's head must be computed in real time. Generally, each frame of the video captured by the camera must be processed to identify and analyze the fiducials to determine the pose of the camera on the user's head. Hence there is a need for a system and methods to efficiently process images having one or more fiducials to compute the pose of the camera capturing the image.

SUMMARY

Accordingly, the present invention includes novel methods to locate and analyze fiducials in an image. Furthermore, the present invention provides novel fiducials that can be more quickly located and analyzed. In addition, the present invention provides a fast novel method of pose estimation.

In some embodiments of the present invention, fiducials are located using a novel method of region segmentation operating on a group of pixels called a "stick." The novel method is well-suited for modern general-purpose CPUs with SIMD instruction sets and deep pipelines. Specifically, region segmentation is accomplished by dividing the image into a plurality of sticks of pixels and determining whether each stick belongs to any region from a set of region. Each stick that belongs to any region is classified as belonging to a specific region. In some embodiments of the present invention, the pixels of each stick are from a single raster line and are generally consecutive pixels of the raster line.

Furthermore, some embodiments of the present invention incorporate a novel method for computing the undistorted moments of a region, i.e. the moments of the rectilinear projection of that region, without resampling the input image. This method for computing undistorted moments can be combined with the novel region segmentation method to perform segmentation and rectified moments calculation in a single pass through the image data.

In some embodiments of the present invention, novel fiducial designs that are based on a plane circle are used. For example, a fiducial pattern in accordance with the present invention may contain a circular main fiducial with an auxiliary fiducial. The auxiliary fiducial is encompassed by the circular main fiducial and is rotationally asymmetric with respect to the circular main fiducial. The main fiducial and the auxiliary fiducial may be of different colors. These designs can provide five or six degree of freedom poses with a single fiducial using efficient closed form solutions. A novel pose estimation method used to select the appropriate solution from the multiple solutions obtained, given certain application assumptions, is also disclosed. Specifically, a primary region is used to represent the main fiducial and a secondary region represents the auxiliary fiducial. A plurality of moments is calculated for the primary region. The moments are used to characterize the primary region as an ellipse. A plurality of parameters for a 5D pose based on the ellipse is calculated. Then, a 6D pose is calculated using the 5D pose and the auxiliary fiducial.

Other embodiments of the present invention may use a multiple fiducial pattern. The multiple fiducial patterns generally have multiple circular main fiducials arranged on a grid. Each circular main fiducial is distinguishable from each other. The circular main fiducials could be distinguished based on color, by use of auxiliary fiducials, by use of identifying features, or other means. Pose estimation using the multiple fiducial pattern is accomplished by calculating a plurality of parameters for one or more 5D poses of a plurality of regions. The 5D poses are grouped into one or more planar groups. The planar group with the most members is selected as the plane of the multiple fiducial pattern. Center differences are calculated for each pair of 5D poses. The orientation of the multiple fiducial pattern is based on the 5D pose with a center distance that most closely equals the grid distance of the multiple fiducial pattern. Identifying features of the fiducials can be used to match regions to specific fiducials.

The present invention will be more fully understood in view of the following description and drawings.

BRIEF DESCRIPTION OF THE DRAWINGS

FIG. 2(b) illustrates the regent segmentation scheme in accordance with one embodiment of the present invention.

DETAILED DESCRIPTION

Figure 1:
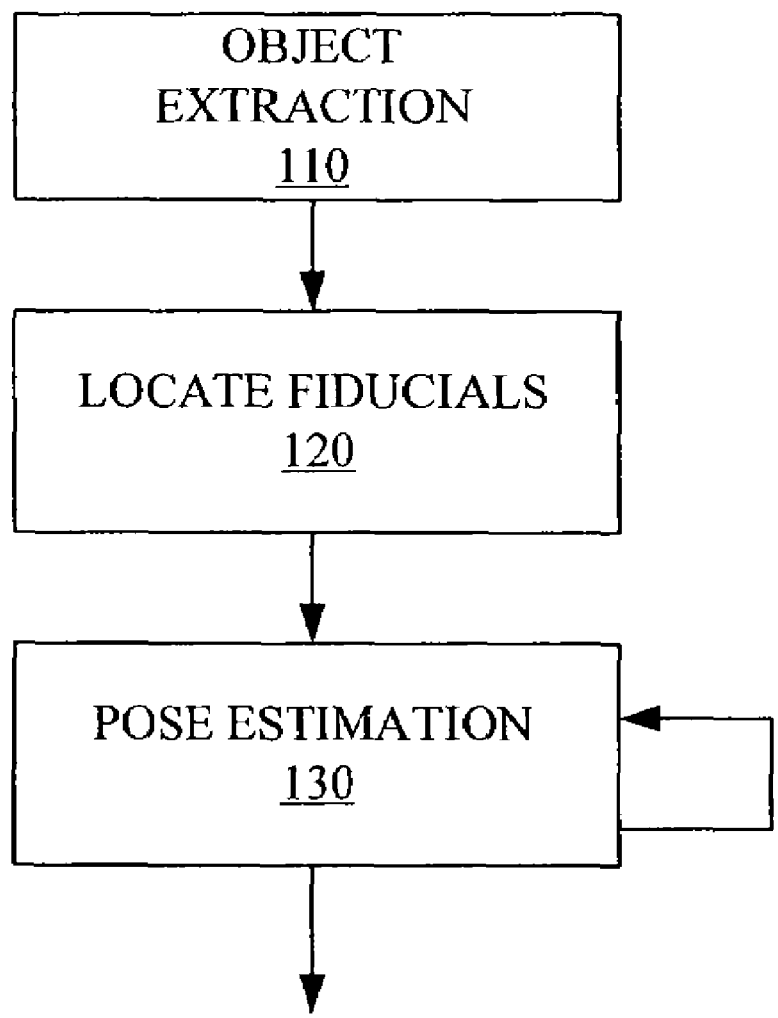
FIG. 1 is a high level flow diagram for fiducial pose estimation in accordance with one embodiment of the present invention.

FIG. 1 is a flow diagram showing the high level steps for a process of fiducial pose estimation from a digital image. This flow diagram is not specific to this invention. First objects in the image are extracted in object extraction step 110. Then, the objects are analyzed to locate the fiducials of the image in locate fiducials step 120. Then, in pose estimation step 130, a pose is estimated for each fiducial found in the image.

Various conventional methods are available for object extraction step 110, locate fiducial step 120, and pose estimation step 130. Embodiments of the present invention may use one or more of the conventional methods in combination with the novel methods described below. For example, in one embodiment of the present invention, conventional methods are used for object extraction step 110 and locate fiducial step 120 in combination with a novel method described below for pose estimation step 130. Other embodiments include novel methods for object extraction step 110 and locate fiducials step 120 as described below.

A variety of methods can be used for object extraction step 110. For example, pixel labeling, run-length connectivity, and CAMSHIFT are conventional region segmentation methods that can be used for object extraction step 110. Boundary-based approaches and region growing methods could also be used for object extraction step 110.

However, most embodiments of the present invention use a novel region segmentation method for object extraction step 110. Specifically, a digital image (which may be a single frame of a digital video) is processed by sequential raster lines. The direction of processing line is not critical; top to bottom processing is described here without loss of generality. Each raster line is processed sequentially by a group of consecutive pixels called a stick. Generally, the number of pixels in a stick is constant for a given implementation, and is chosen based on the operand size of the SIMD instruction set to be used. For example, in one embodiment of the present invention, which uses the Intel MMX instructions, the stick size is chosen to be 8 pixels because 8 independent byte values can be processed with a single instruction. Again, the direction of processing sticks is not critical; left to right processing is described here without loss of generality. The orientation of raster lines may be horizontal or vertical; horizontal raster lines are assumed here without loss of generality.

As used herein, the stick size S_S denotes the number of pixels in a stick, the image size I_S denotes the number of raster lines in the digital image, and line size L_S denotes the number of sticks in a raster line.

As each stick is processed, a binary classifier is applied to its pixels, distinguishing which pixels in the stick are and are not part of some region. Various binary classifiers can be used. For example, color, luminance, or some combination of color and luminance can be used as inputs to the binary classifier. The binary classifier inputs could also be a single component of color or multiple components of colors. For clarity, the examples used herein use color as the basis to distinguish pixels. In some embodiments of the present invention, the binary classifier could be a threshold operation on one color component to produce a Boolean true result, indicating a pixel is part of a region, or a Boolean false result, indicating a pixel is not part of a region. In other embodiments, the binary classifier could be separate threshold operations on multiple color components, which are then combined with Boolean operations to produce a true or false result. For example, in a specific embodiment of the present invention, the binary classifier results are obtained by determining whether a first chrominance value is greater than a first threshold and a second chrominance value is less than a second threshold. Color components used may be in different color spaces in different embodiments, including RGB space and YCbCr space. For example, in one embodiment of the present invention the binary classifier is based on Cb and Cr in YCbCr space because a camera used for this embodiment provides data in YCbCr space and the color channels are at a lower resolution than the luminance data. Using lower resolution allows faster processing. On some processor architectures, the classifier may be applied to several pixels, e.g. the entire stick, simultaneously in parallel.

If all pixels in the stick are classified as not belonging to any region, then the stick does not belong to any region. If one or more pixels in the stick are classified as belonging to a particular region, then those pixels will be assigned to the same region. Note that pixels do not need to be adjacent to be assigned to the same region, a difference from many other segmentation algorithms that require 4- or 8-connected adjacency. Thus the segmentation results from the method described herein are similar but not identical to the results of conventional image segmentation methods.

In one embodiment of the present invention, region identifiers are used to denote regions. The region identifiers are also used to access region data. The region identifier, which is generally a non-negative integer, can be used as an index into a region array. In another embodiment of the present invention, the region identifier is a pointer to a region structure. Because the use of pointers with data structures is well known, only the indexing is described herein. However, one skilled in the art can easily adapt the methods described here to use pointers to a region structure. Region identifiers are used as new regions are encountered in processing the input digital image. If any pixels in a stick are determined to belong to a region, all such pixels will be assigned the same region identifier.

Figure 2A:
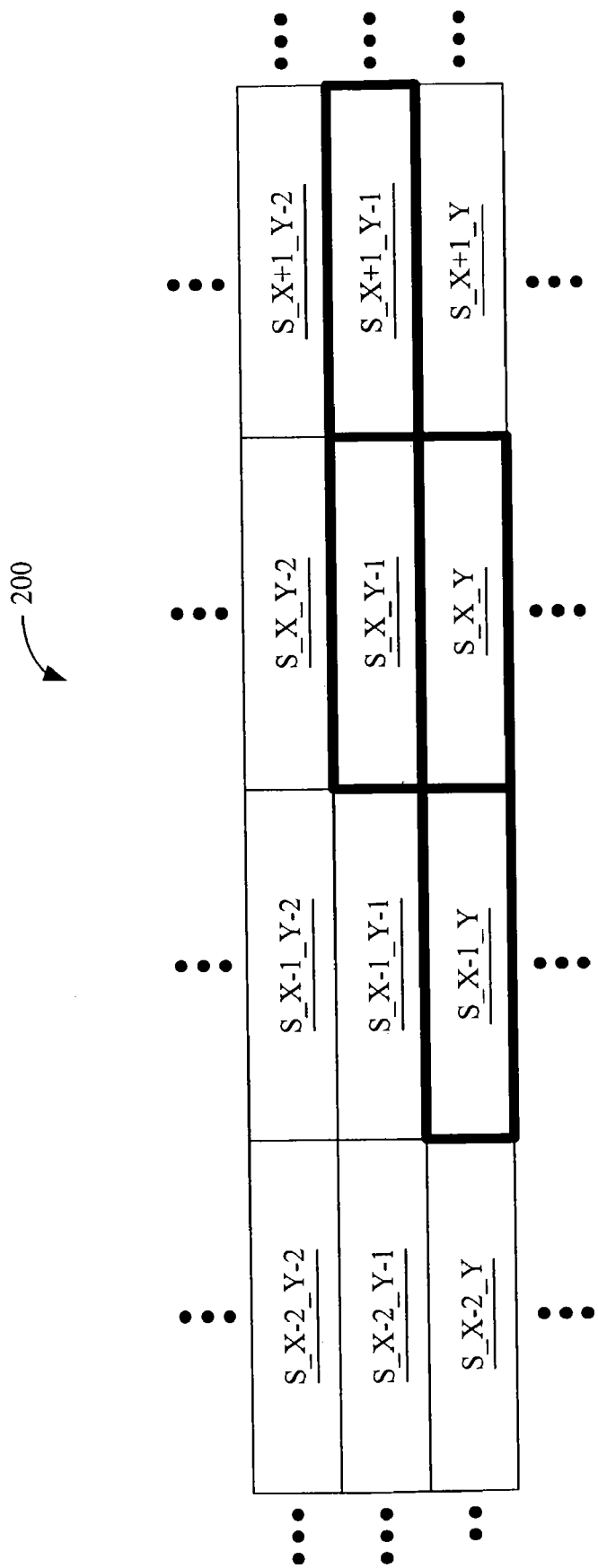
FIG. 2(a) illustrates the grouping of pixels of an image into sticks in accordance with one embodiment of the present invention.

The region identifier assigned to pixels within a stick depends on region identifiers assigned to previously processed sticks. FIG. 2(a) illustrates dependencies for one embodiment of the present invention. Specifically, FIG. 2(a) illustrates a current stick S_X_Y and the some of the sticks processed before current stick S_X_Y of an image 200. The sticks in FIG. 2(a) are referenced with respect to current stick S_X_Y. Specifically, sticks references uses the notation S_I_K, where I is the row position (i.e. the horizontal position within a row) and K is the raster row. Thus stick S_X−1_Y is the stick preceding current stick S_X_Y on the same raster row. Conversely, stick S_X_Y−1 is the stick in the previous raster row in the same row position as current stick S_X_Y. Classification of current stick S_X_Y depends on stick S_X−1_Y (i.e., the stick preceding the current stick on the same raster row), stick S_X_Y−1 (i.e. the stick on the preceding raster row in the same row position as the current stick), and stick S_X+1_Y−1 (i.e., the stick in the previous raster row in the row position following the current stick). The region identifier assigned to the current stick S_X_Y is the earliest region identifier assigned to these previously processed input sticks, disregarding input sticks that either do not exist (because of the image boundary) or do not belong to any region. If no input stick belongs to a region, then the next unused region identifier is assigned to the current stick. Generally, conventional region segmentation methods such as the pixel labeling method where sticks are not used and the region identifiers of previously processed pixels are declared equivalent and merged. For example, in conventional pixel labeling, if one pixel is assigned a region identifier 0 and a neighboring pixel is assigned a region identifier 1, all pixels assigned to region identifiers 0 or 1 are declared to be equivalent, thus the two regions are merged into a single region. In the present invention, when multiple region identifiers are available, the earliest identifier is selected.

FIG. 2(b) is used to illustrate the regent segmentation scheme in accordance with one embodiment of the present invention. Specifically, FIG. 2(b) shows an image 250 having 4 lines labeled as lines L_0, L_1, L_2, and L_3 each having 16 pixels labeled as pixels P_0, P_1, P_2 . . . P_15. A stick S_M_N contains 4 pixels P_(M*4), P_(M*4)+1, P_(M*4)+2, and P_(M*4)+3 on raster line L_N, where M and N are integers in the range of 0 to 3, inclusive. Thus, stick S_0_0, contains pixels P_0, P_1, P_2 and P_3 of line L_0. Similarly, stick S_2_2 contains pixels P_8, P_9, P_10, and P_11, of line L_2. The value within the pixels boxes is the binary classifier input value for the pixel. For clarity, the binary classifier used to determine if a pixel is part of a region is simply a threshold test, with a threshold of 100. Specifically, if the binary classification input value of a pixel is greater than 100, then the pixel is part of a region. Otherwise the pixel is not part of a region.

Analyzing stick S_0_0 finds that pixel P_3 of line L_0 having a binary classifier input value of 179 is part of a region. Because no previous sticks have been processed a new region identifier of 0 is assigned to stick S_0_0. Because all the binary classifier input values of the pixels in stick S_1_0 are zero, stick S_1_0 is not assigned to any region. Similarly, since all the binary classifier input values of the pixels in stick S_2_0 are zero, stick S_2_0 is not assigned to any region. However, in stick S_3_0, pixel P_13 of line L_0 has a binary classification input value of 189 and should be assigned to a region. As explained above with respect to FIG. 2(a), the region identifier assigned to a current stick S_X_Y depends on the region identifier assigned to the previous stick of the same line (S_X−1_Y), the stick in the previous line in the same position (S_X_Y−1) and the stick in the previous line in the next position (S_X+1_Y−1). Because no previous lines have been processed and stick S_2_0 was not assigned a region identifier, stick S_3_0 is assigned to a new region identifier, namely region identifier 1.

In stick S_0_1, pixel P_2 of line L_1 has a binary classifier input value of 201, and pixel P_3 of line L_1 has a binary classifier input value of 234. Thus, stick S_0_1 is part of a region. Because, stick S_0_0 (i.e. the stick in the previous row in the same position as stick S_0_1) has a region identifier of 0, stick S_1_0 (i.e. the stick in the previous row in the next position as stick, S_0_1) does not have a region identifier, and there is no preceding stick of the same line, stick S_0_1 inherits the lowest existing region identifier, i.e. region identifier 0.

In stick S_1_1, pixel P_4 of line L_1 has a binary classifier input value of 196, and pixel P_5 of line L_1 has a binary classifier input value of 198. Thus, stick S_1_1 is part of a region. Because, stick S_0_1 has a region identifier of 0, stick S_1_0 does not have a region identifier, and stick S_2_0 does not have a region identifier, stick S_1_1 inherits the lowest existing region identifier, i.e. region identifier 0. Because all the binary classifier input values of the pixels in stick S_2_1 are zero, stick S_1_0 is not assigned to any region.

In stick S_3_1, pixel P_12 of line L_1 has a binary classifier input value of 184, and pixel P_13 of line L_1 has a binary classifier input value of 216. Thus, stick S_3_1 is part of a region. Because, stick S_2_1 does not have a region identifier, stick S_3_0 has a region identifier of 1, and there does not exist a stick in the previous row in the next position, stick S_3_1 inherits the lowest existing region identifier, i.e. region identifier 1.

In stick S_0_2, pixel P_2 of line L_1 has a binary classifier input value of 192. Thus, stick S_0_2 is part of a region. Because, stick S_0_1 has a region identifier of 0, stick S_1_1 has a region identifier of 0, and there is no preceding stick of the same line, stick S_0_1 inherits the lowest existing region identifier, i.e. region identifier 0.

In stick S_1_2, pixel P_4 of line L_1 has a binary classifier input value of 189, pixel P_5 of line L_1 has a binary classifier input value of 212, and pixel P_7 has a binary classifier input value of 200. Thus, stick S_1_2 is part of a region. Because, stick S_1_1 has a region identifier of 0, stick S_2_1 does not have a region identifier, and stick S_0_2 has a region identifier of 0, stick S_1_2 inherits the lowest existing region identifier, i.e. region identifier 0.

In stick S_2_2, pixel P_8 of line L_2 has a binary classifier input value of 199. Thus stick S_2_2 is part of a region. Stick S_2_2 is adjacent to two regions. Specifically, stick S_1_2 has a region identifier of 0 and stick S_3_1 has a region identifier of 1. As explained above when two region identifiers could be used, the smallest region identifier is selected. Thus, stick S_2_2 is assigned a region identifier of 0. Because all the binary classifier input values of the pixels in stick S_3_2 are zero, stick S_3_2 is not assigned to any region.

In stick S_0_3, pixel P_3 of line L_1 has a binary classifier input value of 207. Thus, stick S_0_3 is part of a region. Because, stick S_0_2 has a region identifier of 0, stick S_1_2 has a region identifier of 0, and there is no preceding stick of the same line, stick S_0_3 inherits the lowest existing region identifier, i.e. region identifier 0.

In stick S_1_3, pixel P_4 of line L_1 has a binary classifier input value of 194. Thus, stick S_1_3 is part of a region. Because, stick S_1_2 has a region identifier of 0, stick S_2_2 has a region identifier of 0, and stick S_0_3 has a region identifier of 0, stick S_1_3 inherits the lowest existing region identifier, i.e. region identifier 0. Because all the binary classifier input values of the pixels in stick S_2_3 are zero, stick S_2_3 is not assigned to any region.

In stick S_3_3, pixel P_13 of line L_3 has a binary classifier of input 191 and pixel P_14 of line L_3 has a binary classifier input value of 194. Thus stick S_3_3 is part of a region. Because stick S_2_3 does not have a region identifier, stick S_3_2 does not have a region identifier, and there does not exist a stick in the previous row in the next position, stick S_3_3 receives a new region identifier of 2.

In one embodiment of the present invention, an array of size L_S+1 region identifiers is used to cache results from the previous line, and the region identifier at position i is denoted as line_id[i]. The region identifier assigned to the previous stick is denoted as current_id. The region identifier of the next unused region identifier is denoted as next_id. Prior to processing the first line, next_id is set to the first region identifier, and all the elements of line_id are set to the last usable region identifier. Before processing the first stick of each line, current_id is set to the last usable region identifier. Sticks are processed in raster order. When stick i of a line is processed, if the binary classifier results in no region, then current_id and line_id[i] are set to the last usable region identifier. If the binary classifier results in a region, then the region identifier for the stick is the earliest of line_id[i], line_id[i+1], current_id, and next_id. current_id and line_id[i] are set to the resulting region identifier, and if the resulting region identifier is equal to next_id then next_id is set to the next unused region identifier.

Figure 3:
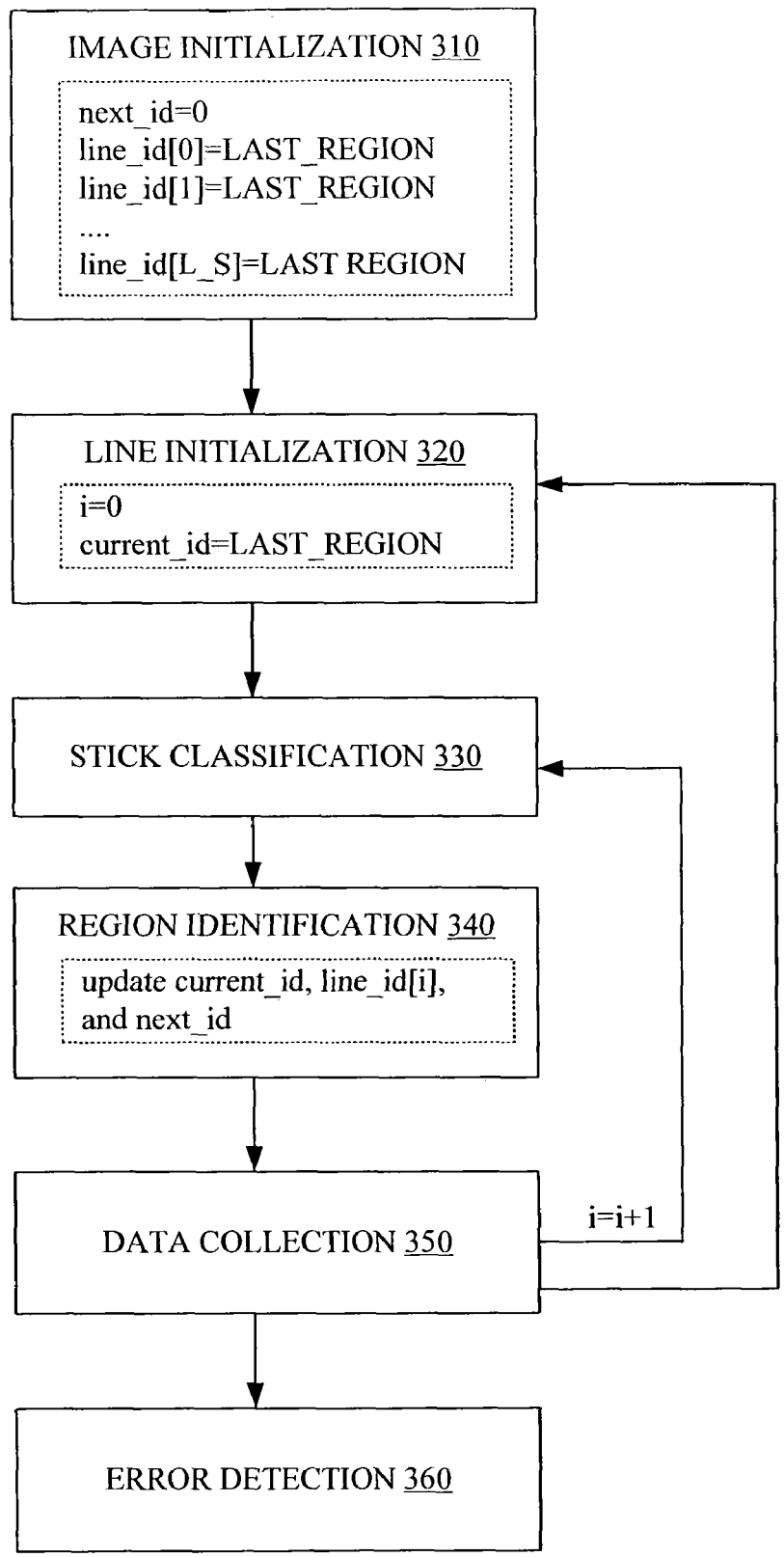
FIG. 3 is a flow diagram for region segmentation in accordance with one embodiment of the present invention.

FIG. 3 is a flow diagram illustrating the region segmentation method in accordance with one embodiment of the present invention. First, in image initialization step 310, next_id and array line_id are reset. Specifically, next_id is set equal to zero and each entry in array line_id is set equal to last region LAST_REGION. In line initialization step 320, stick index i is reset to zero and current_id is set equal to last region LAST_REGION. In stick classification step 330, binary classification is performed on each stick. Then in region identification step 340, the region is identified and process states (current_id, line_id[i], and next_id) are updated. Region identification step 340 is described in detail below with respect to FIGS. 4 and 5. Region data is collected in data collection step 350, which is described below with respect to FIG. 8. If the current stick is not the last stick in a line, stick index I is incremented and processing returns to stick classification step 330. If the current stick is the last stick of a line, processing returns to line initialization step 320. Once all the sticks in all the lines are processed, error detection is performed in error detection step 360. In the embodiment of FIG. 3, if the last region is used, an error is likely to have occurred.

Figure 4:
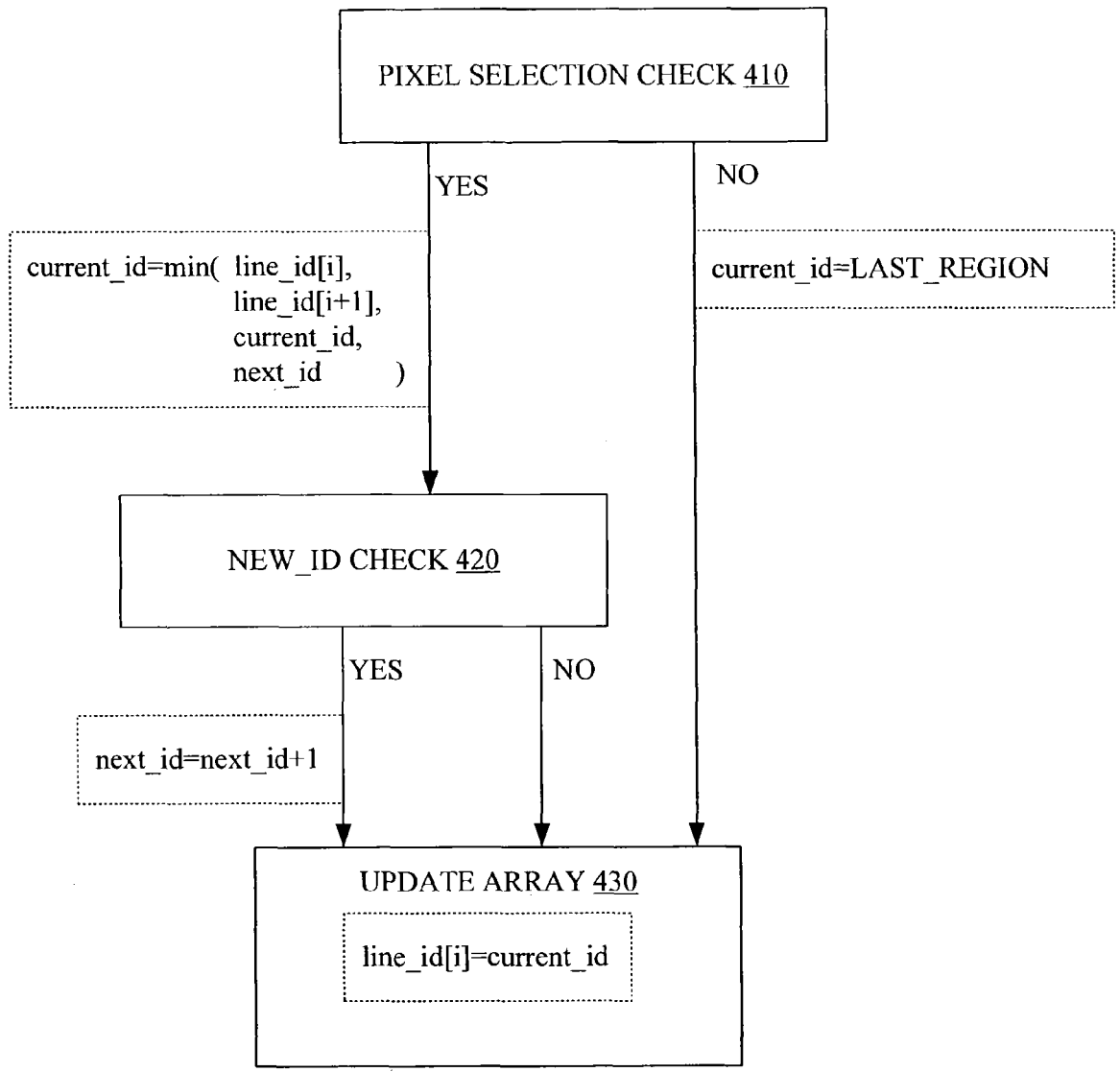
FIG. 4 is a flow diagram for region identification in accordance with one embodiment of the present invention.

FIG. 4 is a flow diagram detailing one implementation of the region identification step 340 in accordance with one embodiment of the present invention. In pixel selection check step 410, whether any pixels in the stick were selected by the stick classification step 330 is determined. If no pixels were selected, current_id is set to the last region and processing is passed to update array step 430. If any pixels were selected then current_id is set to the minimum region identifier of any previously processed sticks. Specifically, current_id is set to the minimum of line_id[I], line_id[I+1], current_id, or next_id. Then, in new_id check step 420, whether a new region identifier is used is determined. Specifically, a comparison is made between current_id and next_id. If current_id matches next_id, next_id is incremented by 1. If current_id does not match next_id, next_id is not incremented. Finally, in update array step 430, the line_id array element is set to current_id for use in processing the next line.

Figure 5:
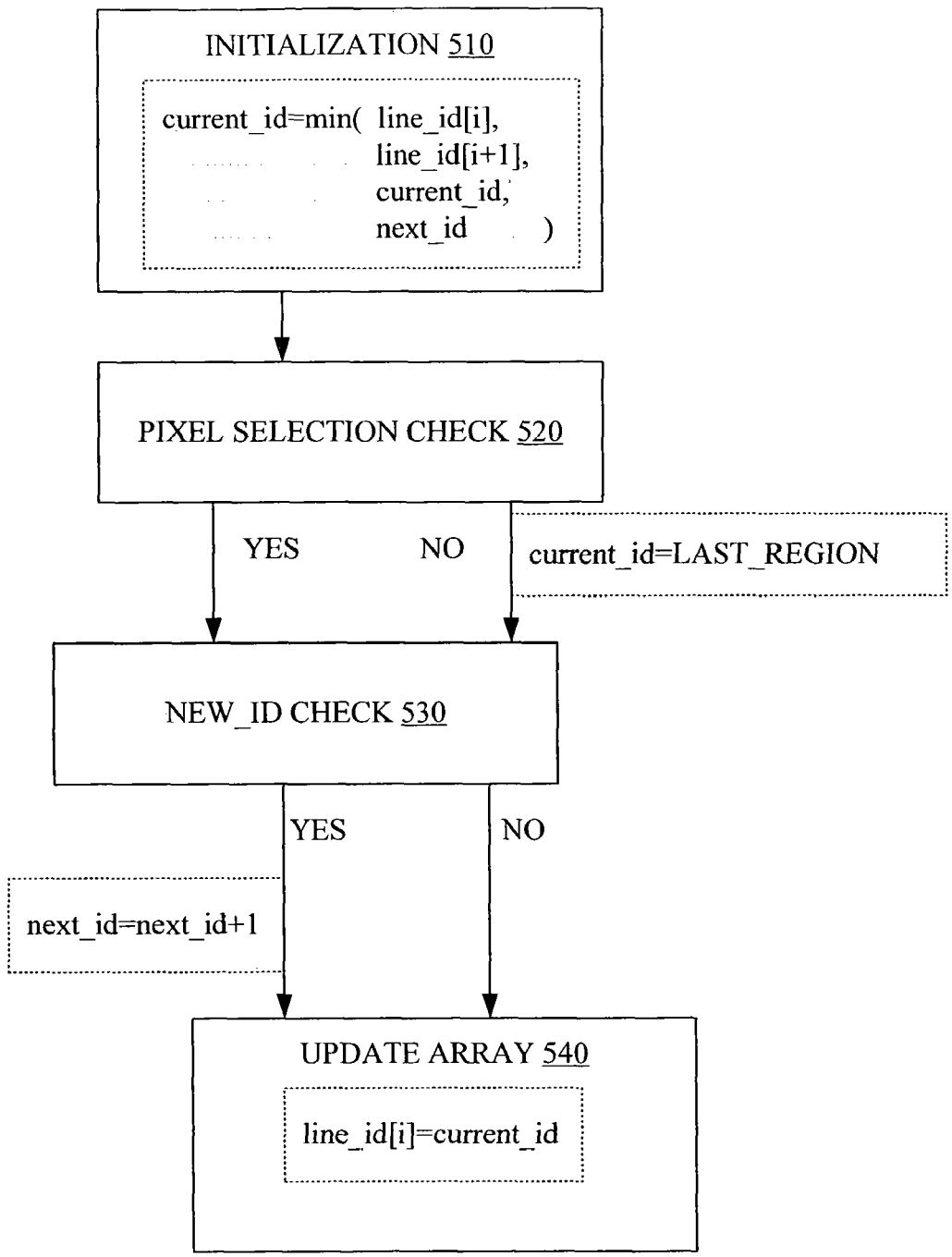
FIG. 5 is a flow diagram for region identification in accordance with another embodiment of the present invention.

FIG. 5 is a flow diagram detailing an alternative implementation region identification step 340 in accordance with one embodiment of the present invention. First in initialization step 510, current_id is set to the minimum region identifier of any previously processed sticks. Specifically, current_id is set to the minimum of line_id[I], line_id[I+1], current_id, or next_id. Then in pixel selection check step 520, whether any pixels in the stick were selected by the stick classification step 330 is determined. If no pixels were selected, current_id is set to the last region and processing is passed to new_id check step 530. If any pixels were selected then current_id is left unchanged and processing is passed to new_id check stop 530. Then, in new_id check step 530, whether a new region identifier is used is determined. Specifically, a comparison is made between current_id and next_id. If current_id matches next_id, next_id is incremented by 1. If current_id does not match next_id, next_id is not incremented. Finally, in update array step 540, the line_id array element is set to current_id for use in processing the next line.

The methods of FIGS. 4 and 5 accomplish the identical calculation. However, the method of FIG. 5 shows how the steps can be reorganized for more efficient implementation on processors with significant penalties for branching, e.g. those with deep pipelines and/or speculative execution. The conditionals pixel selection check step 520 and new_id check step 530 only control whether a variable assignment is made, so they may be implemented with a conditional move instruction where available. The min( ) operation in initialization step 510 can also be implemented with conditional moves if a minimum instruction is not available. Conditional moves do not incur a branching penalty. Thus, region identification step 340 can be implemented without branching penalties.

APPENDIX I provides another embodiment of region segmentation in accordance with the present invention implemented in pseudocode. One skilled in the art can easily adapt the pseudocode to implement region segmentation in accordance with the present invention.

The method of region segmentation described above with respect to FIGS. 3, 4, and 5 and in Appendix I have several advantages as compared to conventional methods. For example, the use of the last usable region identifier allows allocation of a fixed number of regions without a need to check for overflowing the number of regions in the inner loop. If the number of regions detected in the digital image is greater than the number of regions allocated, then next_id will be an invalid region identifier after all the sticks have been processed. The data for the last region may be incorrect, as it will be mixed with all subsequent regions, but all preceding region data will be correct and no out of bounds accesses will occur. This use of a fixed number of regions and precluding the need for error handling makes this embodiment more suitable for hardware implementation. Furthermore because segmentation in accordance with the principles of the present invention can occur in one sequential pass, each pixel only needs to be read once. Thus, the image does not need to be buffered for segmentation, which can result in cost savings by minimizing memory requirements. In addition, segmentation in accordance with the present invention can be accomplished without conditional branching. Conditional branching can stall pipelined processors which results in wasted processing cycles. Thus, segmentation in accordance to the present invention without conditional branching can be processed more rapidly than conventional segmentation methods.

However, the method of region segmentation described above with respect to FIGS. 3, 4, and 5 and APPENDIX I also has a few limitations. One limitation is that if regions are too close together, or if there is excessive noise in binary classification, pixels that should be assigned to different regions may be assigned to the same region. Therefore, regions should be separated by at least stick size N pixels in the direction of the raster to be minimize possibility of misclassification. Another limitation is that a single concave region may be split into two or more separate regions because raster lines are processed sequentially in a single pass. Therefore, Regions should be convex, at least toward earlier raster lines, or some post-processing step to merge concave regions can be applied to improve results. Another limitation is that sticks along the upper left edge of a region in some cases may not be properly assigned with the remainder of the region. These errors decrease with stick size N. Fortunately, there are many applications for which these limitations have negligible effect or can be avoided altogether.

In the high level steps for a process of fiducial pose estimation from a digital image shown in FIG. 1, some region information is obtained during object extraction step 110 and additional fiducial information is obtained in locate fiducial step 120. Some embodiments of the present invention can use conventional methods such as finding the outline of contours, determining vertex locations for pose estimation, bounding boxes, or centroid averaging to locate fiducials in locate fiducial step 120. However, some embodiments of the present invention are able to locate the fiducials within the object extraction step 110 using the region segmentation method described above with respect to FIGS. 3, 4, and 5.

Once a region identifier is determined for a stick, data about the stick is added to the indicated region's data structure. The data may include minimum or maximum line or stick index, and moments. One embodiment uses moments of the form in equation 1 (EQ01).:

$$M_{mn} = \sum_{pixels} \delta(i,j)\rho(i,j)x(i,j)^m y(i,j)^n, m \geq 0 \ \& \ n \geq 0 \qquad \text{EQ01}$$

where $\delta(i,j)$ is 1 or 0 if result of the binary classifier at row i and pixel j is true or false respectively, $\rho(i,j)$ is a weight for the pixel, $x(i,j)$ and $y(i,j)$ are the pixel coordinates, and m and n are the non-negative moment orders.

Most photogrammetry (measurement using images acquired with a camera) algorithms assume that input images are uniformly and orthogonally sampled planar projections of a scene. In practice, images acquired by real cameras may have lens distortions, different spatial sampling frequencies for rows and columns, or other deviations from an ideal planar projection. Camera calibration procedures provide the mapping from row and column samples to an ideal projection $x(i,j)$ and $y(i,j)$. This mapping is generally nonlinear in the presence of distortion. By convention, the canonical calibrated coordinate system for $(x,y)$ places the origin $(0,0)$ at the location of the center of projection (the projection of the optical axis), and the distance of an arbitrary $(x,y)$ from $(0,0)$ is the tangent of the angle the projected ray through that point makes with the optical axis.

Figure 6:
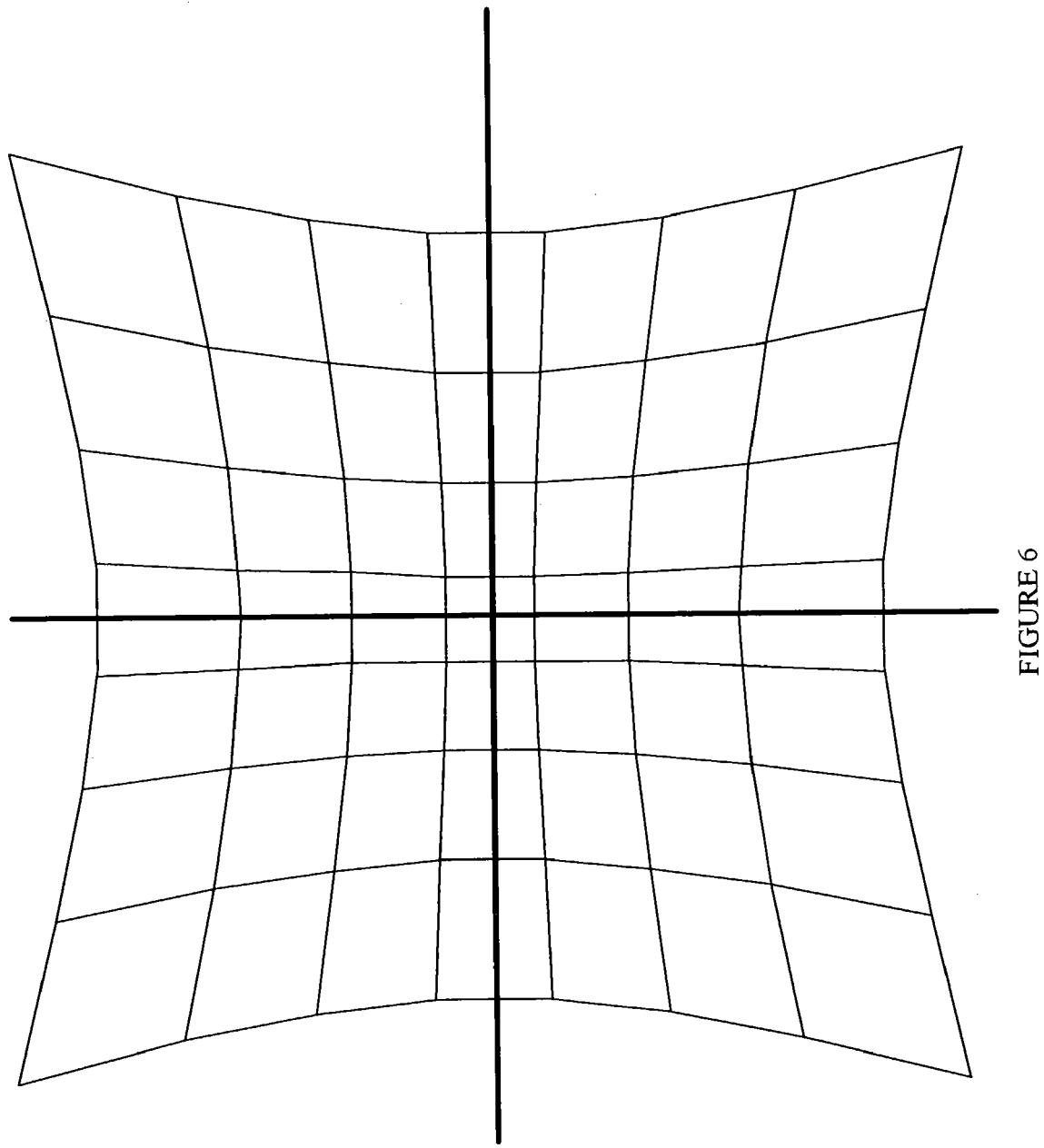
FIG. 6 shows a grid of pixels sampled uniformly in image space mapped onto the canonical planar projection coordinate system.

FIG. 6 shows a simplified image grid overlaid onto the canonical coordinate system. The image is 8×8 with its samples at the grid intersections. In the image coordinate system, the grid would be orthogonal with samples at integral values of i and j. In the calibrated coordinate system, the grid may be curved because of nonlinear undistortion mapping. The bowed-in appearance shown is typical (though exaggerated for expository purposes) of corrected barrel distortion.

Note that the distance between samples (grid points) is larger when further from the origin. The pixel weight $\rho(i,j)$ can be considered the area of the image plane a sample represents. The sum of the pixels weights over all pixels should be the area of an ideal planar projection. If the camera calibration mapping is linear, $\rho(i,j)$ is constant and may be determined by equation 2 (EQ02).

$$\rho = \left\|\left(\frac{\partial x}{\partial i}, \frac{\partial y}{\partial i}\right)\right\| \cdot \left\|\left(\frac{\partial x}{\partial j}, \frac{\partial y}{\partial j}\right)\right\| \qquad \text{EQ02}$$

If the camera calibration is nonlinear, $\rho(i,j)$ will not be constant but can still be approximated with equation (EQ02), by evaluating at every $(i,j)$. An alternative approximation chooses some method of tessellating the image plane into non-overlapping cells in such a way that each cell contains exactly one sample. The $\rho(i,j)$ for any sample is approximated with the area of the corresponding cell. One such method defines quadrilateral cells formed with vertices computed from the weighted sums with neighboring sample coordinates, as in equation 3 (EQ03). Note that $(x(i,j),y(i,j))$ can be computed even if there is no sample at $(i,j)$, so cells on the boundary of the sample grid do not require special handling.

$$v_0 = \frac{1}{4}\sum_{k=-1}^{0}\sum_{l=-1}^{0}(x(i+k,j+l), y(i+k,j+l)) \qquad \text{EQ03}$$

$$v_1 = \frac{1}{4}\sum_{k=0}^{1}\sum_{l=-1}^{0}(x(i+k,j+l), y(i+k,j+l))$$

$$v_2 = \frac{1}{4}\sum_{k=-1}^{0}\sum_{l=0}^{1}(x(i+k,j+l), y(i+k,j+l))$$

$$v_3 = \frac{1}{4}\sum_{k=0}^{1}\sum_{l=0}^{1}(x(i+k,j+l), y(i+k,j+l))$$

Figure 7:
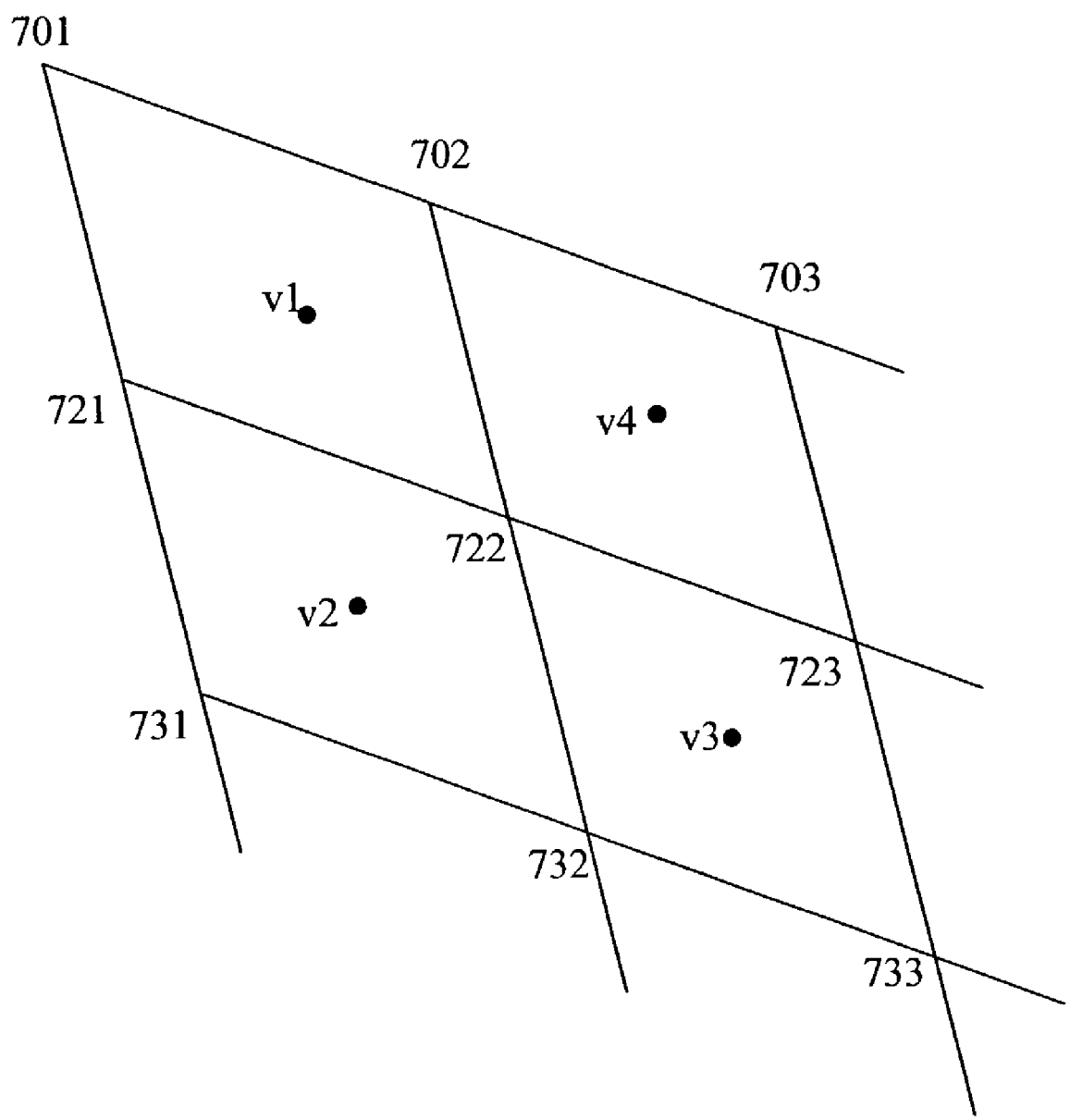
FIG. 7 provides a detailed view of the upper left corner of FIG. 6.

FIG. 7 shows this geometrically by enlarging a portion of FIG. 6. Vertex $v_0$ is the average of the four surrounding vertices 701, 702, 721, 722. Vertex $v_1$ is the average of the four surrounding vertices 702, 703, 722, 723. Vertex $v_2$ is the average of the four surrounding vertices 721, 722, 731, 732. Vertex $v_3$ is the average of the four surrounding vertices 722, 723, 732, 733. The weight $\rho(i,j)$ for the sample $(i,j)$ at the common vertex 722 is the area of the quadrilateral defined by $v_0$, $v_1$, $v_3$, and $v_2$.

Because $\rho(i,j)$, $x(i,j)$, and $y(i,j)$ are invariant with image data, they can be precomputed for any given calibrated camera and stored in a table. The image moment calculation of equation (EQ01) can be expressed as a large inner product of the classifier vector with a precomputed coefficient vector as in equation (EQ04).

$$M_{mn} = \sum_{pixels}\delta(i,j)C_{mn}(i,j) \qquad \text{EQ04}$$

$$C_{mn}(i,j) = \rho(i,j)x(i,j)^m y(i,j)^n$$

APPENDIX II provides another embodiment of moment table generation in accordance with the present invention implemented in pseudocode. One skilled in the art can easily adapt the pseudocode to implement moment table generation in accordance with the present invention.

Figure 8:
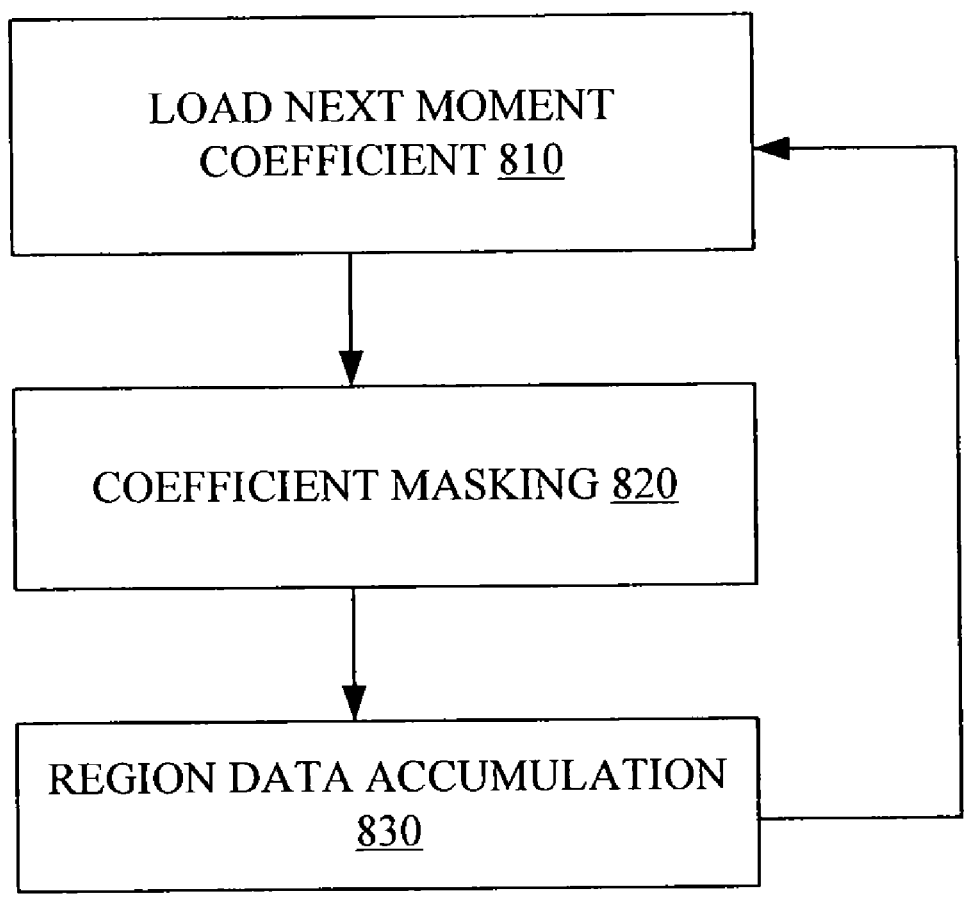
FIG. 8 is a flow diagram for the computation and accumulation of region data.

FIG. 8 is a flow diagram showing a moment data collection method that can be used in data collection step 350 (FIG. 3). First in load next moment coefficient step 810, the next moment coefficient is loaded. Then in coefficient masking step 820, the coefficient is masked depending on the result of the classifier. Specifically, the coefficient is unchanged when the classifier true and the coefficient is changed to zero of the classifier is false. The result is accumulated to the region identified by segmentation, with separate accumulators in the region data structure for each moment in region data accumulation step 830. Load next moment coefficient step 810, coefficient masking step 820, and region data accumulation step 830 is repeated for each moment. Generally, all the pixels in a stick can be processed in parallel.

In practice, masking the coefficient may be done either by representing the classifier result as a bitmask of all ones or all zeros and issuing a bitwise AND with the coefficient, or by representing the classifier result with a 1 or 0 and multiplying with the coefficient. Although the Boolean operation has lower latency on most processors, e.g. 1 cycle vs. 3 cycles on Intel Pentium III, some processors have multiply-accumulate instructions that result in greater throughput by combining part or all of the work in coefficient masking step 820 and region data accumulation step 830.

This formulation has two important advantages. The first and more important advantage is that the moments that result are the statistics of an ideal projection in the calibrated coordinate system, not the original uncalibrated image. Although linear corrections may be applied to uncalibrated moments, nonlinear corrections cannot. Most inexpensive wide angle digital image and video cameras require nonlinear correction. The second advantage is that calculating moments as inner products maps very well onto many SIMD instruction sets, particularly those with a multiply-accumulate operation, and thus can be implemented very efficiently.

Figure 10A:
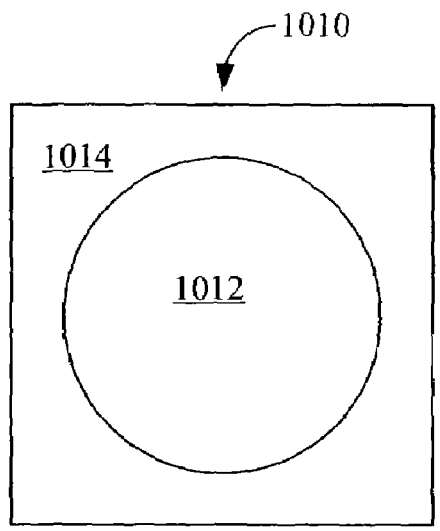
FIGS. 10(a), 10(b), and 10(c) shows three fiducial designs based on a planar circle in accordance with some embodiment of the present invention.

A fiducial is a known object placed in a scene to provide a landmark position, orientation, scale, or other control data. Some embodiments of the invention use a fiducial 1010 having a planar circle 1012 on a planar background 1014 as shown in FIG. 10(*a*). Planar circle 1010 and planar background 1020 are distinguishable from each other with the binary classifier. In general better results are obtained if planar circle 1010 is also distinguishable from the remainder of the environment, or is more prominent than other objects. Planar background 1020 can be omitted if it is known that nothing in the environment will confuse segmentation, but this is generally not advisable.

This fiducial design works well with the region segmentation methods described above. If multiple instances of fiducial 1010 are used, planar background 1014 can be made large enough so that the instances of planar circle 1012 are located in separate regions. The projection of a circle remains convex under any practical camera distortion function and parameters, so planar circle 1012 circle will be recognized as a single region. The tangent to the projection of a circle varies continuously, which limits misassignment on the upper left edge.

A pose is the position and orientation of an object relative to the camera coordinate space. A pose has 6 degrees of freedom, which are typically considered as 3 rotational degrees of freedom (e.g. roll, pitch, and yaw) and 3 translational degrees of freedom (e.g. x, y, and z). Pose is often expressed as a 4×4 matrix that expresses the transform from object space to camera space.

Embodiments of the invention can use a single fiducial with no subregions to determine pose to five of the six degrees of freedom if the application can make some assumptions about fiducial placement. In particular, this can work if the fiducial is kept horizontal and viewed from above. A circle has one free rotational degree of symmetry, so rotation about the plane normal is a free parameter that cannot be uniquely determined without additional features.

Figure 9:
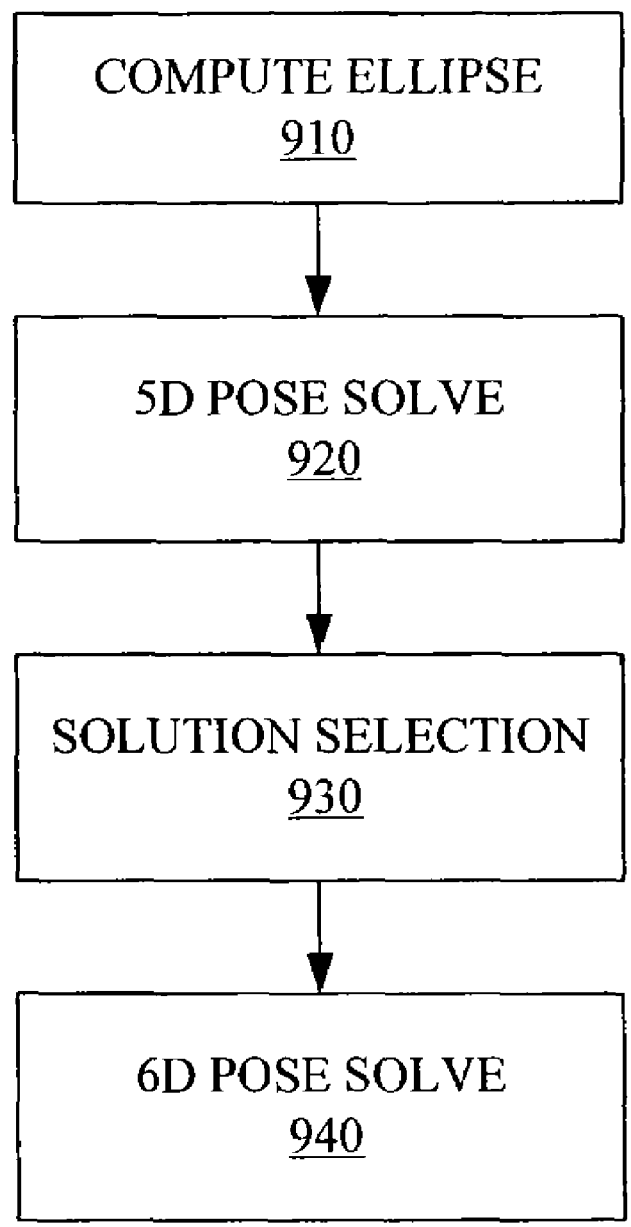
FIG. 9 is a flow diagram for calculating a pose from a fiducial.

FIG. 9 is a flow diagram showing one embodiment of pose estimation step 130 (FIG. 1). The projection of a circular fiducial is an ellipse which is determined from moments in compute ellipse step 910. The ellipse is used to solve for five parameters of a pose in 5D pose solve step 920 as described below. Multiple solutions are generated in 5D pose solve step 920. In solution selection step 930 the correct solution is selected as described below. If auxiliary fiducials are used, optional 6D pose solve step 940 may be used to fix the final degree of freedom in the pose.

The method of pose determination requires computing moments $M_{00}$, $M_{10}$, $M_{01}$, $M_{20}$, $M_{02}$, and $M_{11}$ for the fiducial circle. In one embodiment, this is accomplished by computing the moments for all regions in the digital image and determining which region is the fiducial. If the fiducial is usually prominent in the application, this may be determined by choosing the region with the largest $M_{00}$. Since $M_{00}$ is proportional to area, this is equivalent to choosing the region with largest area.

The planar projection of the fiducial circle will be an ellipse. The ellipse parameters—center $(x_c, y_c)$, semi-axis lengths a and b, and orientation θ (angle the major axis makes with the x-axis)—can be determined from the six moments collected. The center $(x_c, y_c)$ is simply the centroid of the region, as computed in Equation 5 (EQ05).

$$(x_c, y_c) = \left(\frac{M_{10}}{M_{00}}, \frac{M_{01}}{M_{00}}\right) \quad \text{EQ05}$$

The second order moments are adjusted to be relative to the region centroid instead of the image origin by using the parallel axis theorem. This is demonstrated in Equation 6 (EQ06).

$$\mu_{20} = M_{20} - x_c^2 M_{00}$$
$$\mu_{02} = M_{02} - y_c^2 M_{00} \quad \text{EQ06}$$
$$\mu_{11} = M_{11} - x_c y_c M_{00}$$

The orientation θ can be computed from the adjusted second order moments as shown in Equation 7 (EQ07).

$$\theta = \frac{1}{2}\arctan\frac{2\mu_{11}}{\mu_{20} - \mu_{02}} \quad \text{EQ07}$$

Finally, semi-axis lengths a and b are computed as shown in Equation 8 (EQ08).

$$v_{20} = \mu_{20}\cos^2\theta + \mu_{02}\sin^2\theta + 2\mu_{11}\cos\theta\sin\theta$$
$$v_{02} = \mu_{20}\sin^2\theta + \mu_{02}\cos^2\theta - 2\mu_{11}\cos\theta\sin\theta$$

$$a = \sqrt{\sqrt{\frac{4}{\pi}\sqrt{\frac{v_{20}^3}{v_{02}}}}} \quad \text{EQ08}$$

-continued $$b = \sqrt{\sqrt{\frac{4}{\pi}\sqrt{\frac{v_{02}^3}{v_{20}}}}}$$

Given the ellipse equation and the knowledge that it results from the projection of a circle of unit radius, the ellipse is expressed in the matrix form for a conic as shown in Equation 9 (EQ09):

$$A = \frac{\cos^2\theta}{a^2} + \frac{\sin^2\theta}{b^2} \quad \text{EQ09}$$

$$B = \left(\frac{1}{a^2} - \frac{1}{b^2}\right)\cos\theta\sin\theta$$

$$C = \frac{\sin^2\theta}{a^2} + \frac{\cos^2\theta}{b^2}$$

$$D = -Ax_c - By_c$$

$$E = -Cy_c - Bx_c$$

$$F = Ax_c^2 + Cy_c^2 + 2Bx_cy_c - 1$$

$$\underline{Q} = \begin{bmatrix} A & B & D \\ B & C & E \\ D & E & F \end{bmatrix}$$

The eigenvalues and eigenvectors of Q are determined—eigenvalues $\lambda_1$, $\lambda_2$, and $\lambda_3$, in increasing value, and eigenvectors $\underline{e}_1$, $\underline{e}_2$, and $\underline{e}_3$, in corresponding order The normal $\underline{n}$ to the fiducial plane in the camera coordinate system is computed as shown in Equation 10 (EQ10).

$$\varphi = \pm\arctan\sqrt{\frac{\lambda_2 - \lambda_1}{\lambda_3 - \lambda_2}} \quad \text{EQ10}$$

$$\underline{n} = \begin{bmatrix} \underline{e}_1 & \underline{e}_2 & \underline{e}_3 \end{bmatrix} \begin{bmatrix} \cos\varphi & 0 & \sin\varphi \\ 0 & 1 & 0 \\ -\sin\varphi & 0 & \cos\varphi \end{bmatrix} (0, 0, 1)^T$$

As noted in the references, there are multiple possible solutions with this computation. One ambiguity is the sign in the formula for φ, which arises because either the positive or negative square root may be used. In addition, the signs of the eigenvectors are independently arbitrary. These ambiguities allow up to four distinct solutions for $\underline{n}$ (two anti-parallel vector pairs).

For certain applications, only one of the fiducial orientations corresponding to the solutions for $\underline{n}$ will be expected. For example, if the fiducial is known to be horizontal and the camera is kept generally upright, then only one of the solutions will be appropriate. For this solution, the normal $\underline{n}$ will point opposite the camera optical axis and in the same direction as the camera up vector. For example, if the camera coordinate system is such that the optical axis points in the (0,0,−1) direction and the up vector is (0,1,0), then the correct $\underline{n}$ is the one with positive y and z components.

The location of the center $\underline{c}$ of the fiducial in camera coordinates may be found as shown in Equation 11 (EQ11), in which the sign of α on the last line is chosen to be the same as the sign of φ in Equation 10 (EQ10) (r is the radius of the circle).

$$d = \sqrt{r\frac{-\lambda_2^2}{\lambda_1\lambda_3}} \quad \text{EQ11}$$

$$\alpha = \frac{d}{\lambda_2}\sqrt{(\lambda_3 - \lambda_2)(\lambda_2 - \lambda_1)}$$

$$\underline{c} = \begin{bmatrix} \underline{e}_1 & \underline{e}_2 & \underline{e}_3 \end{bmatrix} \begin{bmatrix} \cos\varphi & 0 & \sin\varphi \\ 0 & 1 & 0 \\ -\sin\varphi & 0 & \cos\varphi \end{bmatrix} (\pm\alpha, 0, d)^T$$

The computed centers of auxiliary fiducials may be determined by the same or different means than that previously described. Any different means may use the five known degrees of freedom from one fiducial as additional input information.

Another method of fixing the final degree of freedom is to use an auxiliary fiducial with a strong orientation on the image plane, such as a thin rectangle or ellipse. Two points along the auxiliary fiducial major axis on the image plane are found. A complete matrix transform T from object space to camera space may be constructed as shown in Equation (EQ12), where $\underline{p}$ and $\underline{q}$ are the 2D points homogeneously extended to 3D by appending a 1 as the z/w coordinate, i.e. $(p_x, p_y)$ becomes $(p_x, p_y, 1)$ and $(q_x, q_y)$ becomes $(q_x, q_y, 1)$.

$$s = \frac{\underline{c}\cdot\underline{n}}{\underline{p}\cdot\underline{n}} \quad \text{EQ12}$$

$$t = \frac{\underline{c}\cdot\underline{n}}{\underline{q}\cdot\underline{n}}$$

$$\underline{u} = \frac{t\underline{q} - s\underline{p}}{\|t\underline{q} - s\underline{p}\|}$$

$$\underline{v} = \underline{n} \times \underline{u}$$

$$\underline{T} = \begin{bmatrix} \underline{u} & \underline{v} & \underline{n} & \underline{c} \\ 0 & 0 & 0 & 1 \end{bmatrix}$$

Finding two points that define a major axis of the auxiliary fiducial can be determined by several image analysis methods. One convenient method is to use the same region segmentation and moment calculation machinery as the main fiducial (with a different binary classifier). The centroid of the auxiliary fiducial, computed using Equation 5 (EQ05), is one appropriate point. The second point can be generated by adding the scaled orientation vector (ε cos θ, ε sin θ) derived using Equation 7 (EQ07) to the centroid, where ε is a small scaling factor. The scaling factor is needed to keep the projection of the second point onto the fiducial plane in front of the camera.

Figure 10B:
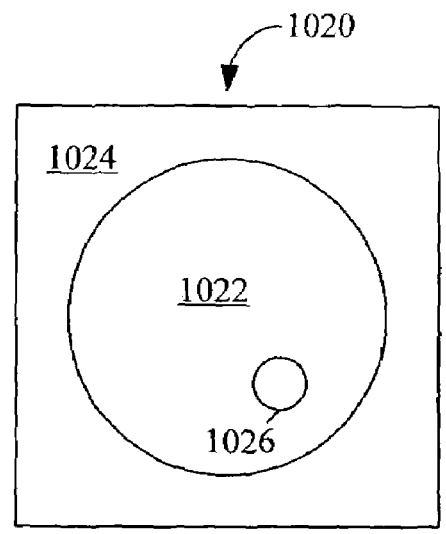
Figure 10C:
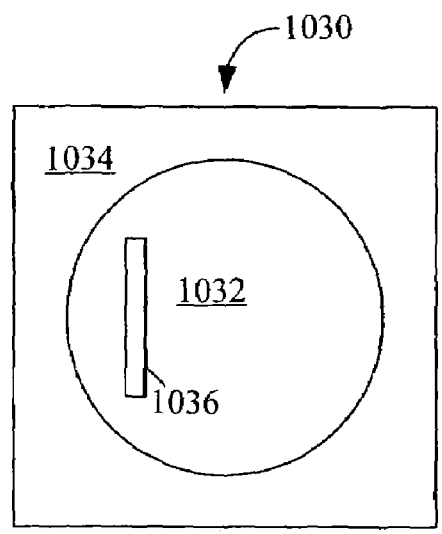

In both methods using auxiliary fiducials, auxiliary fiducials can be placed within the bounds of the main fiducial. Any such auxiliary fiducial should not extend outside the border of the main fiducial, and their position should be rotationally asymmetric. Since the main fiducial serves as the background for auxiliary fiducials, auxiliary fiducials must be distinguishable from the main fiducial, typically by color. FIG. 10(b) shows a fiducial 1020, which includes a planar square background 1024, a planar circle 1022 (i.e., "the main fiducial"), and an auxiliary circular fiducial 1026 of contrasting color, with a smaller radius than planar circle 1022. Auxiliary circular fiducial 1026, is placed off-center and within the planar circle 1022, all on planar background 1024. As illustrated in FIG. 10(c), in another embodiment of the present invention, a fiducial 1030 includes a planar circle 1032 (i.e., "the main fiducial") on a planar background 1034 and a auxiliary thin rectangular fiducial 1036 of contrasting color. Auxiliary thin rectangular fiducial 1036, which has a length that is smaller than the diameter of planar circle 1032, is placed off-center and within planar circle 1032 on planar background 1034. Planar background 1024 and 1034 can be omitted if it is known that nothing in the scene will confuse segmentation, but this is generally not advisable.

Embodiments of the present invention segments and computes moments for the main fiducial (i.e. the large circle), including all enclosed auxiliary fiducials. This can be done in either one or two passes. The one-pass approach is to use a binary classifier that selects both main and auxiliary fiducial pixels. The two-pass approach uses a different binary classifier on each pass. The first pass segments and computes moments for the main fiducial excluding the enclosed auxiliary fiducials. The second pass segments and computes moments for the enclosed auxiliary fiducials. The corresponding moments are summed to get the moments for the main fiducial including the enclosed auxiliary fiducials, taking advantage of the linear property of moments. The two-pass approach is likely to be superior, because the one-pass binary classifier is likely to be more complex and because the moments for the auxiliary fiducials will be used separately.

There are several advantages to this design of incorporating auxiliary fiducials within a main fiducial with rotational asymmetry. First, the asymmetry allows determination of all six degrees of freedom. In addition, placing auxiliary fiducials within the bounds of the main fiducial places fewer limits on usable camera positions, because multiple separated fiducials do not have to be in view, only the main fiducial. Finally, finding the bounds of the main fiducial in the first pass can be used to restrict the search and analysis for auxiliary fiducials in the second pass, which can improve performance.

Some embodiments of the present invention use a multiple fiducial pattern rather than a single fiducial. Generally, multiple fiducial patterns are used when the camera view is not expected to keep a single fiducial in view. A properly designed pattern can allow pose determination from a subset of the fiducials, and can accommodate fiducials entering and leaving the field of view as the camera position and/or orientation is changed.

Figure 11:
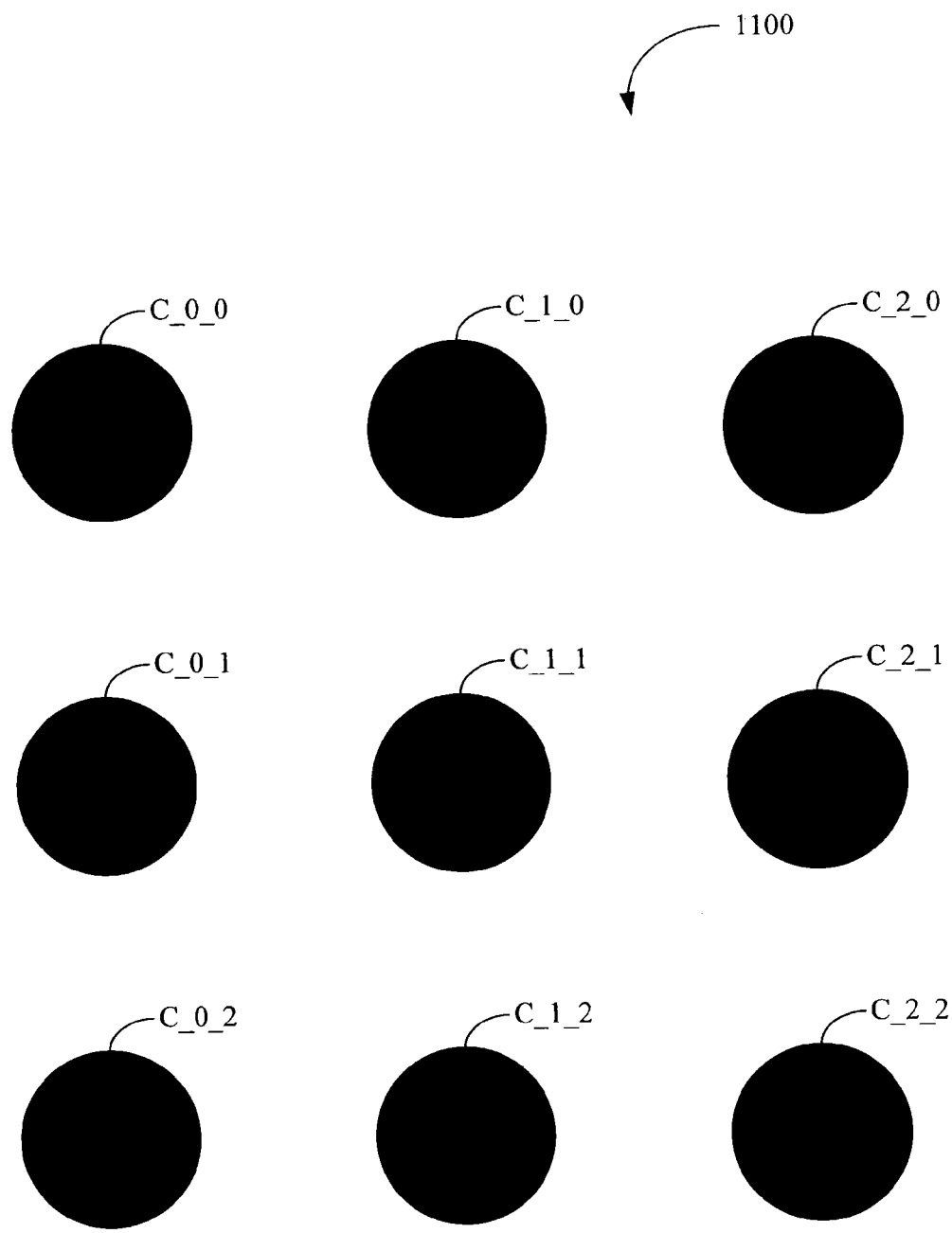
FIG. 11 shows a multiple fiducial pattern in accordance with one embodiment of the present invention.

FIG. 11 shows a multiple fiducial pattern 1100 that can be used with the region segmentation process of this invention, which performs object extraction and locates the individual fiducials of the multiple fiducial pattern. Specifically, FIG. 11 is a grid of circles C_0_0, C_0_1, ... C_3_3 having identical radii. Each circle serves as a main fiducial in the multiple fiducial pattern. Generally, the fiducials of a multiple fiducial pattern are distinguishable from each other. For example, in one embodiment of the present invention, each main fiducial is a different color. In another embodiment, each main fiducial encompasses an auxiliary fiducial that uniquely identifies the main fiducial.

In one embodiment of the present invention, the region segmentation process returns statistics for each fiducial seen by the camera in a single pass. The process described above for the single fiducial situation is repeated on each fiducial seen by the camera to generate a 5 degree of freedom pose for each fiducial seen by the camera. However, the disambiguation step that selects one of the two pose solutions can be skipped, allowing two 5 degree of freedom poses for each circle because further processing rejects poses that are not consistent with the multiple fiducial pattern.

The pose estimation process provides a set of fiducial centers and normals. Some of these poses correctly represent the fiducials on the grid. However, other poses may be incorrect due to segmentation errors, in complete fiducials at the edge of an image, or being the incorrect solution to the pose problem. These incorrect poses must be removed from consideration.

In one embodiment of the present invention, poses are separated into groups that approximately represent the same 3D plane, i.e. all poses in a group have the same normal to within some tolerance and the centers are on the same plane to within some tolerance, with the following procedure. An initially empty list of planes, where a plane is defined with a normal Np and a point on the plane Pp, is created. Each pose, which consists of a normal Nc and a center Pc, is tested for the first match against the list of planes by satisfying Equation 13a (EQ13a), Equation 13b (EQ13b), and Equation 14 (EQ14).

$$(Nc \cdot Np)^2 > Kn \qquad \text{EQ13a}$$

$$\frac{((Pc - Pp) \cdot Np)^2}{\|Pc - Pp\|^2} < Kp \qquad \text{EQ13b}$$

In a particular embodiment of the present invention, a value of 0.98 for Kn and a value of 0.01 for Kp has been used. If the pose does not satisfy the inequalities for any plane on the list, then a new plane is added to the list with Np equal to Nc and Pp equal to Pc. Each pose is thus assigned to a plane group.

The distance between the centers of each pair of poses is examined. The pair with a distance closest to the grid distance g is used to estimate the grid orientation. The normalized vector from one center of the pair to the other is used as one characteristic direction u of the grid. The other characteristic direction v is computed with the cross product Np×u.

The plane group with the most poses is assumed to be the plane of the multiple fiducial pattern. All other poses are rejected and removed from further consideration. Then a correspondence between each remaining pose and a grid point is established. First a pose center Pc is chosen arbitrarily to be the origin, Z. For each pose, the corresponding grid indices (x, y) are chosen by Equation 14 (EQ14)

$$(x, y) = \left( \text{round}\left( (Pc - Z) \cdot \frac{\vec{u}}{g} g \right), \text{round}\left( (Pc - Z) \cdot \frac{\vec{v}}{g} \right) g \right) \qquad \text{EQ14}$$

where round(x) returns the nearest integer to x, and g is the grid distance between circles.

At this point there is a set of corresponding grid indices (x,y) and circle centers Pc. The approximate transform T that maps coordinates in grid space [xg yg 0 1] to world space is shown in Equation 16 (EQ16)

$$T = \begin{bmatrix} \vec{u} & 0 \\ \vec{v} & 0 \\ Np & 0 \\ Z & 1 \end{bmatrix} \qquad \text{EQ16}$$

The quality of the transform of Equation 16 (EQ16) depends on camera resolution, low noise, etc. An optional transform refinement may be done by using this transform as an initial estimate to a conventional pose estimation algorithm that uses nonlinear optimization to determine a pose that is least squares optimal. This method uses T to transform grid points into camera space. An error function is defined as the sum of squared distances between the transformed grid points projected into screen space and the observed centers Pc also projected into screen space. The transform T is iteratively adjusted, using the multidimensional Newton's method, to minimize the error. Newton's method converges quadratically provided that the initial choice of T is close enough to the optimal value. The calculation of T described here has been observed to be more than adequate for convergence in practice.

Transform T of Equation 16 (EQ16) does not uniquely relate the observed fiducials to the multiple fiducial pattern because the origin Z was chosen arbitrarily. Therefore, the observed fiducials may be offset from by an integer number of grid positions. Similarly, because the grid direction can be set from any adjacent pair of fiducials, the orientation can be rotated from one solution to another by a multiple of 90° about the plane normal. Additional information is required to keep the solution consistent, to fix the grid origin and axes.

In one embodiment of the present invention, additional identifying features are added to the multiple fiducial pattern to help determine the true origin and axes of the multiple fiducial pattern. The identifying features should be distributed over the multiple fiducial pattern, so that the identifying features may be seen whenever a usable subset of the multiple fiducial pattern is visible. In addition, the identifying features should not interfere with the fiducial pose estimation process. For example, in general the identifying features should not overlap the fiducials. Furthermore, the identifying features should be locatable and interpretable under any arbitrary offsets and orientations possible in transform T of Equation 16 (EQ16).

In some embodiments of the present invention, the identifying features are placed near each fiducial in the multiple fiducial pattern. Because the identifying fields accompany each fiducial, the identifying features are visible whenever multiple fiducials are visible. Generally, the identifying marker should be easily distinguished from the fiducials. Thus, in some embodiments of the present invention, the identifying markers are a different color than the fiducials. In a particular embodiment of the present invention the fiducials are red circles and the identifying features are black polygons.

The identifying features around each fiducial should be unique (i.e. different from the identifying features around any other fiducial). Using unique identifying feature for each fiducial identifies the offset of the fiducials from the true origin of the multiple fiducial pattern. Furthermore, the identifying features should be asymmetric, i.e. not the same as any identifying features of this or any other fiducial when rotated by a multiple of 90°. The asymmetry of the identifying features identifies the true grid axes.

Figure 12:
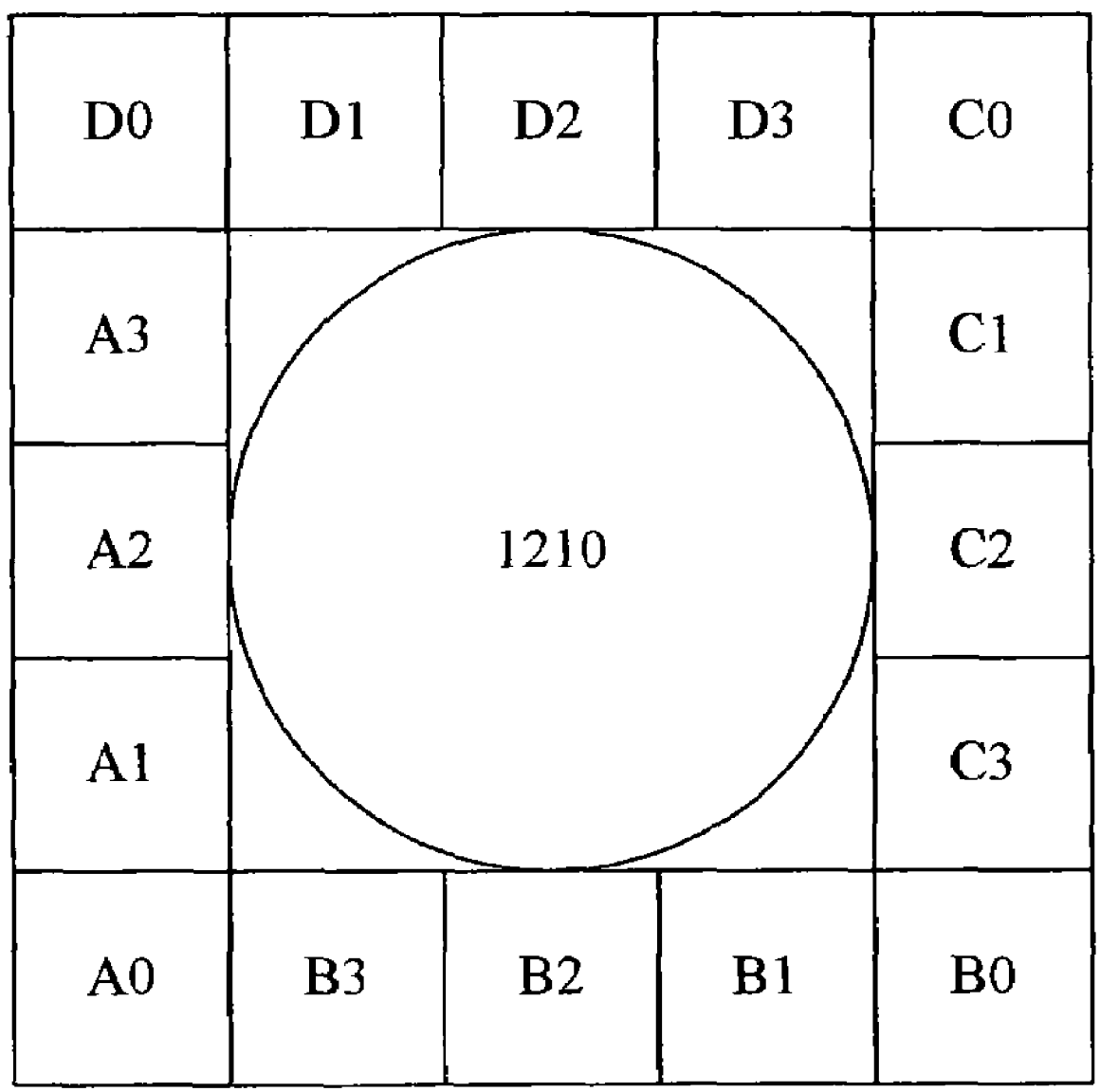
FIG. 12 illustrates identifying features as used in one embodiment of the present invention.

FIG. 12 illustrates the identifying features used in one embodiment of the present invention. For the embodiment of FIG. 12, a circular fiducial 1210 is surrounded by 16 square identifying features A0, A1, A2, A3, A4, B0, B1, B2, B3, C0, C1, C2, C3, and D0, D1, D2, D3. Each identifying feature is interpreted as a bit, either filled with the background color for binary 0, or filled with a color different from both the background color and the color circular fiducial 1210 for binary 1. The bits are grouped into four binary numbers A (A3 A2 A1 A0), B (B3 B2 B1 B0), C (C3 C2 C1 C0), and D (D3 D2 D1 D0). In the correct orientation, the grid indices are (A,B), and the values C=A+1 and D=B+1. Thus, in the correct orientation, the binary value on the right edge is one more than the binary value on the left edge, and the binary value on the top edge is one more than the binary value on the bottom edge.

Figure 13A:
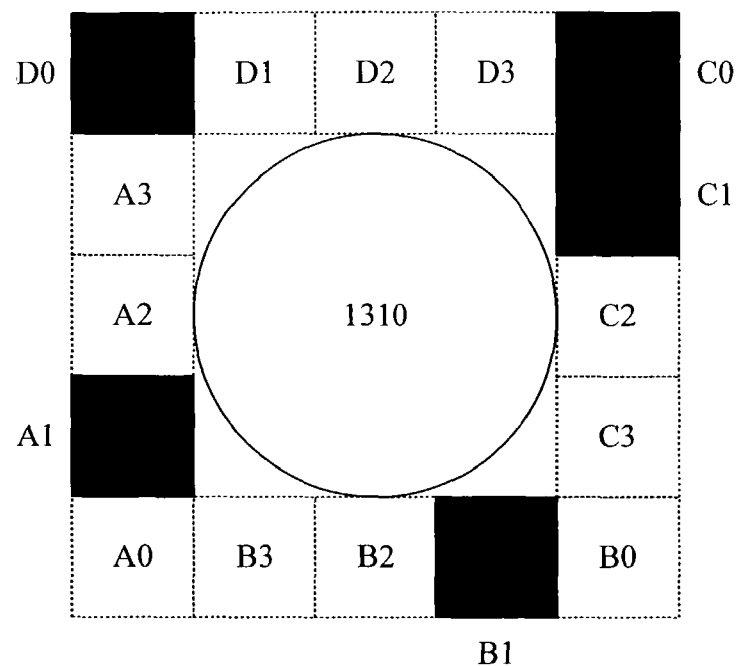
FIGS. 13(a) and 13(b) illustrates the decoding of identifying features in accordance with one embodiment of the present invention.
Figure 13B:
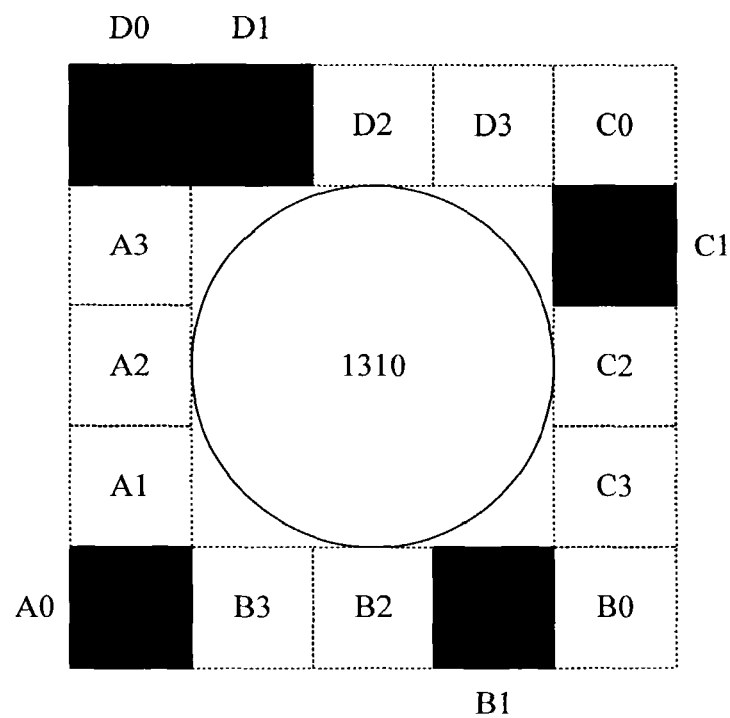

FIG. 13(a) shows an example of a circular fiducial with the appropriate identifying features shaded black. In FIG. 13(a) A is 2 (0010b), B is 2 (0010b), C is 3 (0011b), and D is 1 (0001b). In the correct orientation, D should be equal to B+1. However in FIG. 13(a), D does not equal B+1. Thus the orientation of FIG. 13(a) is not correct. However as illustrated in FIG. 13(b), if FIG. 13(a) is rotated 90° counterclockwise (−90° clockwise), the proper relationship of C and D relative to A and B are achieved. Specifically, A is equal to 1 (0010b), B is equal to 2, C is equal to A+1, i.e. 2, and D is equal to B+1, i.e. 3. Therefore, fiducial 1310 is the fiducial at grid position (1, 2). In FIG. 13(a) the identifying features indicate that the multiple fiducial pattern had been rotated −90° counterclockwise (90° clockwise).

There are identifying features that can be used with different embodiments of the present invention. For example, one embodiment of the present invention uses different colors in the identifying features to help distinguish one fiducial from another. Furthermore, error-detecting or error-correcting codes may be used to prevent misreading the markings.

The final pose matrix P relative to the true grid origin, when the arbitrarily chosen origin is found to have grid indices (i,j) and rotated by an angle θ (a multiple of 90°), is given in equation 17 (EQ17)

$$P = \begin{bmatrix} 1 & 0 & 0 & 0 \\ 0 & 1 & 0 & 0 \\ 0 & 0 & 1 & 0 \\ -ig & -jg & 0 & 1 \end{bmatrix} \begin{bmatrix} \cos\theta & -\sin\theta & 0 & 0 \\ \sin\theta & \cos\theta & 0 & 0 \\ 0 & 0 & 1 & 0 \\ 0 & 0 & 0 & 1 \end{bmatrix} T \quad \text{EQ17}$$

The present invention includes a novel and efficient region segmentation method and a novel-calibrated moment calculation method that can be independently used together or independently in many image processing and computer vision applications. The methods described herein process image data in a single pass per classifier and can be implemented without branching except for loop control, thus the methods are suitable for parallel and hardware implementation. Different embodiments of the present invention may use the set of moments detailed here, or different choices of moments. For example, in one embodiment of the present invention, $0^{th}$ and $1^{st}$ order moments are chosen when only region centroids are required. In another embodiment of the present invention, moments through $3^{rd}$ or $4^{th}$ order may be chosen to calculate Hu invariants, used in pattern recognition. Because the methods described herein do not require initialization from previous frames, the methods can be used on single images and in video applications even when frame to frame coherence is not guaranteed.

In some embodiments of the present invention, region segmentation and/or moment calculation are implemented in the same device as a camera. The limiting resource on some computer vision systems is the data bandwidth from the camera to the computer, which impacts both latency and throughput. Processing image data into region data and transferring only the region data would allow a substantial reduction in required bandwidth if the image data is not further required.

By combining the methods described herein, the pose of a single fiducial can be determined under certain assumptions that allow the correct pose from multiple solutions to be discriminated. One sufficient set of assumptions is that the fiducial is horizontal and the camera does not look down past the vertical.

The present invention is well-suited for augmented reality applications that do not involve physical interaction with the real or virtual objects in view, which is sometimes called fishtank virtual reality. This allows the use of a single fiducial, since user movement will not obscure it. A camera is attached to the user's head, and the invention is used to track the position of the user relative to the fiducial. 3D graphics are displayed to the user, compensating for head motion. The 3D graphics may be shown on a head-mounted display or on a monitor, with or without stereo. A head mounted display allows the user to change the presented view using natural head movements instead of being moderated through a user interface device like a mouse or joystick.

In one embodiment of the present invention, a fiducial or fiducials can be realized directly on the case of a portable computing device that implements the pose estimation and generates 3D graphics. The user can move his head or a control device in order to change the view. In another embodiment, the fiducial may be mounted on an embedded turntable that can be rotated to change the fiducial orientation. From the point of view of the user, the graphics are drawn with a consistent spatial relationship to the fiducial or fiducials. For example, a fiducial is attached to a small computing device with a head-mounted display. 3D virtual objects are drawn so that they appear to be on top of the fiducial. The view may be wholly virtual, or may include real objects either by optical or video means.

In the various embodiments of this invention, novel structures and methods have been described for region segmentation, region characterization, and pose estimation. In view of this disclosure, those skilled in the art can define other fiducial patterns, multiple fiducial patterns, sticks, regions, binary classifiers, threshold levels, color components, moments, weighting tables, main fiducials, auxiliary fiducials, identifying features, poses, planar groups, plane normals, pose normals, center differences, and so forth, and use these alternative features to create a method or system according to the principles of this invention. Thus, the invention is limited only by the following claims.

APPENDIX I

Copyright (c) 2003 Shoestring Research, LLC

All Rights Reserved

```
// initialize region ID buffer to last region ID
for ( int j = 0; j <= ImageWidth/StickSize; ++j )
    line_id[j] = LastRegionID;
// initialize region data
for ( int k = 0; k <= LastRegionID; ++k )
{
    // reset moment accumulators to zero
    moment00[k] = 0;
    moment10[k] = 0;
    moment01[k] = 0;
    moment20[k] = 0;
    moment02[k] = 0;
    moment11[k] = 0;
    // reset region bounds
    topmost_line[k] = ImageHeight;
    leftmost_stick[k] = ImageWidth/StickSize;
}
// initialize next available unused ID
next_id = 0;
// loop over image lines
for ( int i = 0; i < ImageHeight; ++i )
{
    // initialize previous stick ID to next available unused ID
    current_id = next_id;
```

-continued

```
    // loop over sticks in the line
    for ( int j = 0; j < ImageWidth/StickSize; ++j )
    {
        // classify the stick, producing a vector of StickSize 1s and/or 0s
        class_vector = BinaryClassifier(stick[i][j]);
        // determine the conditional region ID
        // min( ) is a function that returns the minimum of its
        // arguments.
        current_id = min(current_id,line_id[j],line_id[j+1]);
        // update state depending on if any pixels classified 1
        if ( class_vector == 0 ) // no pixels classified 1
        {
            current_id = next_id;
            line_id[j] = LastRegionID;
            // remainder of loop may be optionally skipped here
        }
        else // at least 1 pixel classified 1
        {
            line_id[j] = current_id;
            // check if a new region ID was assigned,
            if ( current_id == next_id )
                // increment the next available ID
                next_id = next_id + 1;
                // record the starting line
                topmost_line[current_id] = i;
        }
        // record the lowest stick number for this region
        // min( ) is a function that returns the minimum of its
        // arguments.
        leftmost_stick[current_id] =
min(leftmost_stick[current_id],j);
        // accumulate moments for this region
        // DotProduct( ) is a function that returns the inner product of
        // two vectors that are each StickSize in length.
        moment00[current_id] = moment00[current_id] +
            DotProduct(class_vector,weights00[i][j]);
        moment10[current_id] = moment10[current_id] +
            DotProduct(class_vector,weights10[i][j]);
        moment01[current_id] = moment01[current_id] +
            DotProduct(class_vector,weights01[i][j]);
        moment20[current_id] = moment20[current_id] +
            DotProduct(class_vector,weights20[i][j]);
        moment02[current_id] = moment02[current_id] +
            DotProduct(class_vector,weights02[i][j]);
        moment11[current_id] = moment11[current_id] +
            DotProduct(class_vector,weights11[i][j]);
    }
}
```

APPENDIX II copyright (c) 2003 Shoestring Research, LLC

All Rights Reserved

```
// loop over image lines
for ( int i = 0; i < ImageHeight; ++i )
{
    // loop over sticks in the line
    for ( int j = 0; j < ImageWidth/StickSize; ++j )
    {
        // loop over pixels in the stick
        for ( int k = 0; k < StickSize; ++k )
        {
            // map coordinates into camera space
            // The corners and center of the 1x1 square centered at
            // (j*StickSize + k,i) are mapped into camera space.
            // Coord2D is a
            // type that holds a 2D coordinate. MapImageToCamera( ) is a
            // function that applies the camera model to convert
```

-continued

```
coordinates
            // from image space (line and pixel indices) into the
canonical
            // calibrated coordinate system. See [Tsai 86] for the
standard
            // reference on camera calibration.
            const Coord2D v =
                MapImageToCamera((j*StickSize + k), i);
            const Coord2D v00 =
                MapImageToCamera((j*StickSize + k) – 0.5,i – 0.5);
            const Coord2D v10 =
                MapImageToCamera((j*StickSize + k) + 0.5,i – 0.5);
            const Coord2D v01 =
                MapImageToCamera((j*StickSize + k) – 0.5,i + 0.5);
            const Coord2D v11 =
                MapImageToCamera((j*StickSize + k) + 0.5,i + 0.5);
            // compute moment multipliers
            // QuadrilateralArea( ) is a function that returns the
area of a
            // quadrilateral defined by the four 2D coordinate
arguments.
            // Bretschneider's formula (among others in geometry
texts) can
            // be used to implement such a function.
            weights00[i][j][k] = QuadrilateralArea(v00,v10,v01,v11);
            weights10[i][j][k] = v.x*weights00[i][j][k];
            weights01[i][j][k] = v.y*weights00[i][j][k];
            weights20[i][j][k] = v.x*weights10[i][j][k];
            weights02[i][j][k] = v.y*weights01[i][j][k];
            weights11[i][j][k] = v.y*weights10[i][j][k];
        }
    }
}
```

What is claimed is:

1. A method of segmenting an image having a plurality of pixels, the method comprising:
    using a processor to perform the steps of:
    dividing the image into a plurality of sticks of pixels, wherein each stick contains at least two pixels;
    determining whether each stick belongs to any region from a set of region; and
    classifying each stick that belongs to any region as belonging to a specific region of the set of regions, wherein the classifying each stick that belongs to any region as belonging to a specific region of the set of regions comprises:
    determining whether any member of a set of previously processed sticks belong to any region;
assigning an earliest region identifier of a set of previously processed sticks to the current stick When a member of the set of previously processed sticks belongs to any region and the current stick belongs to any region; and
    assigning a new region identifier to the current stick when the current stick belongs to any region and no member of the set of previously processed sticks belongs to any region.

2. The method of claim 1, wherein each pixel of each stick are from a single raster line.

3. The method of claim 2, wherein each pixel of each stick are consecutive pixels of the single raster line.

4. The method of claim 2, wherein a size of each stick is a multiple of a word size of a SIMD processor.

5. The method of claim 1, wherein determining whether each stick belongs to any region from a set of region comprises:
    determining whether any pixel of a current stick belongs to any region; and
    classifying the current stick as belonging to any region when any pixel of the current stick belongs to any region.

6. The method of claim 5, wherein the determining whether any pixel of a current stick belongs to any region comprises comparing a binary classifier input value with a threshold level.

7. The method of claim 6, wherein the binary classifier input value is a color component.

8. The method of claim 6, wherein the binary classifier input value is a luminance value.

9. The method of claim 6, wherein the binary classifier is a chrominance value.

10. The method of claim 5, wherein the determining whether any pixel of a current stick belongs to any region comprises:
    comparing a first binary classifier input value with a first threshold level;
    comparing a second binary classifier input value with a second threshold level.

11. The method of claim 1, wherein the set of previously processed sticks comprises:
    a preceding stick on the same raster row as the current stick;
    a first stick on a preceding raster row; and
    a second stick on the preceding raster row.

12. The method of claim 11, wherein the first stick is in a same row position as the current stick and the second stick is in a following row position of the current stick.

13. The method of claim 1, further comprising characterizing each region of the set of regions.

14. A method of segmenting an image having a plurality of pixels, the method comprising:
    using a processor to perform the steps of:
    dividing the image into a plurality of sticks of pixels, wherein each stick contains at least two pixels;
    determining whether each stick belongs to any region from a set of region;
    classifying each stick that belongs to any region as belonging to a specific region of the set of regions; and
    characterizing each region of the set of regions, wherein the characterizing each region of the set of regions comprises computing rectified moments for each region using a weighting table and unrectified image data.

15. The method of claim 14, wherein the weighted lookup table comprises pre-computed coefficient vectors.

16. The method of claim 15, wherein the pre-computed coefficient vectors are a product of a weight factor, a first pixel coordinate raised to a non-negative power, and a second pixel coordinate raised to a non-negative power.

17. A method of segmenting an image having a plurality of pixels, the method comprising:
    using a processor to perform the steps of:
    dividing the image into a plurality of sticks of pixels, wherein each stick contains at least two pixels;
determining whether each stick belongs to any region from a set of region; and
    classifying each stick that belongs to any region as belonging to a specific region of the set of regions, wherein each stick belongs to only one region, wherein the classifying each stick that belongs to any region as belonging to a specific region of the set of regions comprises:
    determining whether any member of a set of previously processed sticks belong to any region;
    assigning an earliest region identifier of a set of previously processed sticks to the current stick when a member of the set of previously processed sticks belongs to any region and the current stick belongs to any region; and assigning a new region identifier to the current stick when the current stick belongs to any region and no member of the set of previously processed sticks belongs to any region.

18. The method of claim 17, wherein each pixel of each stick are from a single raster line.

19. The method of claim 18, wherein each pixel of each stick are consecutive pixels of the single raster line.

20. The method of claim 18, wherein a size of each stick is a multiple of a word size of a STMD processor.

21. The method of claim 17, wherein determining whether each stick belongs to any region from a set of region comprises:
determining whether any pixel of a current stick belongs to any region; and
classifying the current stick as belonging to any region when any pixel of the current stick belongs to any region.

22. The method of claim 21, wherein the determining whether any pixel of a current stick belongs to any region comprises comparing a binary classifier input value with a threshold level.

23. The method of claim 22, wherein the binary classifier input value is a color component.

24. The method of claim 22, wherein the binary classifier input value is a luminance value.

25. The method of claim 22, wherein the binary classifier is a chrominance value.

26. The method of claim 21, wherein the determining whether any pixel of a current stick belongs to any region comprises:
comparing a first binary classifier input value with a first threshold level;
comparing a second binary classifier input value with a second threshold level.

27. The method of claim 17, wherein the set of previously processed sticks comprises:
a preceding stick on the same raster row as the current stick;
a first stick on a preceding raster row; and
a second stick on the preceding raster row.

28. The method of claim 27, wherein the first stick is in a same row position as the current stick and the second stick is in a following row position of the current stick.

29. The method of claim 17, further comprising characterizing each region of the set of regions.

30. A method of segmenting an image having a plurality of pixels, the method comprising:
using a processor to perform the steps of:
dividing the image into a plurality of sticks of pixels, wherein each stick contains at least two pixels;
determining whether each stick belongs to any region from a set of region;
classifying each stick that belongs to any region as belonging to a specific region of the set of regions, wherein each stick belongs to only one region; and
characterizing each region of the set of regions, wherein the characterizing each region of the set of regions comprises computing rectified moments for each region using a weighting table and unrectified image data.

31. The method of claim 30, wherein the weighted lookup table comprises pre-computed coefficient vectors.

32. The method of claim 31, wherein the pre-computed coefficient vectors are a product of a weight factor, a first pixel coordinate raised to a non-negative power, and a second pixel coordinate raised to a nonnegative power.

33. A system of segmenting an image having a plurality of pixels, the system comprising:
means for dividing the image into a plurality of sticks of pixels, wherein each stick contains at least two pixels;
means for determining whether each stick belongs to any region from a set of region; and
means for classifying each stick that belongs to any region as belonging to a specific region of the set of regions, wherein the means for classifying each stick that belongs to any region as belonging to a specific region of the set of regions comprises:
determining whether any member of a set of previously processed sticks belong to any region;
assigning an earliest region identifier of a set of previously processed sticks to the current stick when a member of the set of previously processed sticks belongs to any region and the current stick belongs to any region; and
assigning a new region identifier to the current stick when the current stick belongs to any region and no member of the set of previously processed sticks belongs to any region.

34. The system of claim 33, wherein each pixel of each stick are from a single raster line.

35. The system of claim 34, wherein each pixel of each stick are consecutive pixels of the single raster line.

36. The system of claim 34, wherein a size of each stick is a multiple of a word size of a SIMD processor.

37. The system of claim 33, wherein the means for determining whether each stick belongs to any region from a set of region comprises:
means for determining whether any pixel of a current stick belongs to any region; and
means for classifying the current stick as belonging to any region when any pixel of the current stick belongs to any region.

38. The system of claim 37, wherein the means for determining whether any pixel of a current stick belongs to any region comprises means for comparing a binary classifier input value with a threshold level.

39. The system of claim 38, wherein the binary classifier input value is a color component.

40. The system of claim 38, wherein the binary classifier input value is a luminance value.

41. The system of claim 38, wherein the binary classifier is a chrominance value.

42. The system of claim 37, wherein the means for determining whether any pixel of a current stick belongs to any region comprises:
means for comparing a first binary classifier input value with a first threshold level;
means for comparing a second binary classifier input value with a second threshold level.

43. The system of claim 33, wherein the set of previously processed sticks comprises:
a preceding stick on the same raster row as the current stick;
a first stick on a preceding raster row; and
a second stick on the preceding raster row.

44. The system of claim 43, wherein the first stick is in a same row position as the current stick and the second stick is in a following row position of the current stick.

45. The system of claim 33, further comprising characterizing each region of the set of regions.

46. A system of segmenting an image having a plurality of pixels, the system comprising:
means for dividing the image into a plurality of sticks of pixels, wherein each stick contains at least two pixels;

means for determining whether each stick belongs to any region from a set of region;

means for classifying each stick that belongs to any region as belonging to a specific region of the set of regions; and characterizing each region of the set of regions, wherein the characterizing each region of the set of regions comprises computing rectified moments for each region using a weighting table and unrectified image data.

47. The system of claim 46, wherein the weighted lookup table comprises pre-computed coefficient vectors.

48. The system of claim 47, wherein the pre-computed coefficient vectors are a product of a weight factor, a first pixel coordinate raised to a non-negative power, and a second pixel coordinate raised to a non-negative power.

49. The system of claim 48, wherein the means for determining whether each stick belongs to any region from a set of region comprises:

means for determining whether any pixel of a current stick belongs to any region; and means for classifying the current stick as belonging to any region when any pixel of the current stick belongs to any region.

50. The system of claim 49, wherein the means for determining whether any pixel of a current stick belongs to any region comprises means for comparing a binary classifier input value with a threshold level.

51. The system of claim 50, wherein the binary classifier input value is a color component.

52. The system of claim 50, wherein the binary classifier input value is a luminance value.

53. The system of claim 50, wherein the binary classifier is a chrominance value.

54. The system of claim 49, wherein the means for determining whether any pixel of a current stick belongs to any region comprises:

means for comparing a first binary classifier input value with a first threshold level;

means for comparing a second binary classifier input value with a second threshold level.

55. A system of segmenting an image having a plurality of pixels, the system comprising:

means for dividing the image into a plurality of sticks of pixels, wherein each stick contains at least two pixels;

means for determining whether each stick belongs to any region from a set of region; and means for classifying each stick that belongs to any region as belonging to a specific region of the set of regions, wherein each stick belongs to only one region, wherein the means for classifying each stick that belongs to any region as belonging to a specific region of the set of regions comprises:

means for determining whether any member of a set of previously processed sticks belong to any region;

means for assigning an earliest region identifier of a set of previously processed sticks to the current stick when a member of the set of previously processed sticks belongs to any region and the current stick belongs to any region; and means for assigning a new region identifier to the current stick when the current stick belongs to any region and no member of the set of previously processed sticks belongs to any region.

56. The system of claim 55, wherein each pixel of each stick are from a single raster line.

57. The system of claim 56, wherein each pixel of each stick are consecutive pixels of the single raster line.

58. The system of claim 56, wherein a size of each stick is a multiple of a word size of a SIMD processor.

59. The system of claim 55 wherein the set of previously processed sticks comprises:

a preceding stick on the same raster row as the current stick;

a first stick on a preceding raster row; and a second stick on the preceding raster row.

60. The system of claim 59, wherein the first stick is in a same row position as the current stick and the second stick is in a following row position of the current stick.

61. The system of claim 55, further comprising means for characterizing each region of the set of regions.

62. A system of segmenting an image having a plurality of pixels, the system comprising:

means for dividing the image into a plurality of sticks of pixels, wherein each stick contains at least two pixels;

means for determining whether each stick belongs to any region from a set of region;

means for classifying each stick that belongs to any region as belonging to a specific region of the set of regions, wherein each stick belongs to only one region; and means for characterizing each region of the set of regions, wherein the means for characterizing each region of the set of regions comprises means for computing rectified moments for each region using a weighting table and unrectified image data.

63. The system of claim 62, wherein the weighted lookup table comprises pre-computed coefficient vectors.

64. The system of claim 63, wherein the pre-computed coefficient vectors are a product of a weight factor, a first pixel coordinate raised to a nonnegative power, and a second pixel coordinate raised to a non-negative power.

* * * * *